(12) United States Patent
Sano et al.

(10) Patent No.: US 7,518,976 B2
(45) Date of Patent: Apr. 14, 2009

(54) OPTICAL HEAD WITH LIGHT SOURCES OF DIFFERENT WAVELENGTH

(75) Inventors: Kousei Sano, Osaka (JP); Yoshiaki Komma, Hirakata (JP); Toshiyasu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 358 days.

(21) Appl. No.: 10/543,537

(22) PCT Filed: Jan. 27, 2004

(86) PCT No.: PCT/JP2004/000689

§ 371 (c)(1),
(2), (4) Date: Jul. 27, 2005

(87) PCT Pub. No.: WO2004/068480

PCT Pub. Date: Aug. 12, 2004

(65) Prior Publication Data

US 2006/0077550 A1 Apr. 13, 2006

(30) Foreign Application Priority Data

Jan. 30, 2003 (JP) .............................. 2003-021839

(51) Int. Cl.
*G11B 7/13* (2006.01)
(52) U.S. Cl. ................. 369/120; 369/44.41; 369/94
(58) Field of Classification Search .................. None
See application file for complete search history.

(56) References Cited

U.S. PATENT DOCUMENTS

| | | | | |
|---|---|---|---|---|
| 4,410,968 A | * | 10/1983 | Frohbach et al. | 369/44.39 |
| 5,724,338 A | * | 3/1998 | Birukawa et al. | 369/275.2 |
| 5,862,118 A | * | 1/1999 | Takahashi | 369/44.23 |
| 5,923,632 A | * | 7/1999 | Kato et al. | 369/112.07 |
| 6,130,872 A | | 10/2000 | Sugiura et al. | |
| 6,442,125 B1 | * | 8/2002 | Maeda et al. | 369/112.1 |

(Continued)

FOREIGN PATENT DOCUMENTS

EP 1 001 413 5/2000

(Continued)

*Primary Examiner*—Michael V Battaglia
(74) *Attorney, Agent, or Firm*—Hamre, Schumann, Mueller & Larson, P.C.

(57) ABSTRACT

The present invention is provided with a detection region for detecting light that is reflected from a first or a second information recording medium and that passes through an optical element. The first information recording medium and the second information recording media are multi-layer disks that have at least two layers, and the detection region includes a detection region (41) for detecting first order and above diffracted light that has a first wavelength, and a detection region (42) for detecting first order and above diffracted light that has a second wavelength. The detection region (41) is arranged such that it does not straddle across a region that is divided by a maximum range (38) of the dilation of zero order light coming from the first information recording medium that comes from a recording layer that differs from the recording layer that is to be recorded or reproduced, and the detection region (42) is arranged such that it does not straddle across a region that is divided by a maximum range (39) of the dilation of zero order light coming from the second information recording medium that comes from a recording layer that differs from the recording layer that is to be recorded or reproduced.

2 Claims, 18 Drawing Sheets

U.S. PATENT DOCUMENTS

| | | | |
|---|---|---|---|
| 6,567,355 B2 * | 5/2003 | Izumi et al. | 369/44.41 |
| 6,624,942 B2 * | 9/2003 | Maruyama et al. | 359/566 |
| 6,654,718 B1 * | 11/2003 | Maeda et al. | 704/229 |
| 6,822,771 B2 * | 11/2004 | Funato et al. | 359/15 |
| 2002/0018432 A1 * | 2/2002 | Ohuchida | 369/112.04 |
| 2002/0181343 A1 * | 12/2002 | Hayashi et al. | 369/44.23 |
| 2003/0007436 A1 | 1/2003 | Komma et al. | |

FOREIGN PATENT DOCUMENTS

| | | |
|---|---|---|
| EP | 1 109 163 | 6/2001 |
| JP | 2000-123398 | 4/2000 |
| JP | 2001-307362 | 11/2001 |
| JP | 2002-216385 | 8/2002 |
| JP | 2002-319177 | 10/2002 |

* cited by examiner

US 7,518,976 B2

OPTICAL HEAD WITH LIGHT SOURCES OF DIFFERENT WAVELENGTH

TECHNICAL FIELD

The present invention relates to optical heads for recording, reproducing or deleting information stored on information recording media such as, for example, optical disks and optical cards, and apparatuses and systems provided with such optical heads.

BACKGROUND ART

Applications of optical memory technology using optical disks as high density and high capacity information recording media are expanding to digital audio disks, video disks and document file disks and also to data files, and entering mainstream use. In order successfully to achieve highly reliable recording and reproduction of information onto optical disks via a highly stopped down light beam, a focusing function that forms a minute spot at the diffraction limit, and optical system focusing control, tracking and pit signal (information signal) detection functions are necessary.

In recent years, the development of optical disks with high density recording capacity that is greater than that of conventional optical disks has advanced due to the advancement of optical system design technology and a reduction in the wavelengths of semiconductor lasers serving as the light source. Increasing the size of the optical disk side numerical aperture (NA) of the focusing optical system that stops down the light beam to a minute point also has been investigated as another approach to increase the density.

Compact disks (CDs), which may be considered first generation optical disks, use infrared light (with a wavelength $\lambda 3$ of 780 nm-820 nm) and an objective lens having an NA of 0.45, and the substrate thickness of the disks is 1.2 mm. Second generation DVDs use red light (with a wavelength $\lambda 2$ of 630 nm-680 nm) and an objective lens having an NA of 0.6, and the substrate thickness of the disks is 0.6 mm. For third generation high density disks, a system using blue light (with a wavelength $\lambda 1$ of 380 nm-420 nm) and an objective lens having an NA of 0.85, and having disk substrate thicknesses of 0.1 mm is proposed.

It should be noted that in the present application, substrate thickness refers to the thickness of the transparent substrate from the surface at which the light beam is incident on the optical disk (or information recording medium) to the information recording surface.

In this manner, the substrate thickness of the optical disk gets thinner as the recording density increases. Furthermore, dual layering of the recording layer is carried out as another method for realizing higher densities. For DVDs, dual-layer disks are the standard for read only ROM disks, and for high density third generation disks, dual-layer disks have also been proposed for recordable disks.

An optical disk appatus that can record and reproduce optical disks having different substrate thicknesses and recording densities is desirable from the point of view of economics, and the space that the apparatus occupies. Thus, it is necessary to have an optical head device that is provided with an optical detection system that can detect light of different wavelengths that are irradiated onto optical disks.

Detection is possible if individual photodetectors are provided for each different wavelength of light. However the optical system thus becomes complex, the flexible cable for outputting signals from the detectors also becomes complicated, and there is an increase in cost.

In the case of recording and reproducing different types of optical disks, a conventional example in which a single photodetector is shared is proposed in, for example, Patent Reference 1 below. However, in this example it is a prerequisite that focus detection is by an astigmatic aberration method, and when using disks such as DVD-RAM in which the groove pitch is relatively large compared to the light spot on the disk, there have been problems such as external interference affecting the focus signal when transversing the tracks, causing the focus servos to become unstable.

Furthermore, the optical heads up to now have not taken into consideration multi-layer disks having a plurality of formats, and countermeasures for offset fluctuations due to light scattering from other layers have not been implemented.

The details proposed in Patent Document 1 hereby are described briefly with reference to FIGS. 18 and 19. FIG. 18 shows a structural overview of an optical head 1. FIG. 18A shows a state of the optical head 1 when recording and reproducing information on a DVD, and FIG. 18B shows how the optical head 1 records and reproduces information onto a CD. The optical head 1 contains a red semiconductor laser 2 that generates light having a wavelength of 650 nm, and an infrared semiconductor laser 3 that generates light having a wavelength of 780 nm.

First, the case in which a DVD disk is reproduced is described. Light generated by the red semiconductor laser 2 passes through a wavelength selection prism 4 and is converted to parallel light by a collimating lens 5. The light that is converted to parallel light is reflected by a beam splitter 6, passes through a wavelength filter 7 and a ¼ wavelength plate 8, is converted to convergent light by an objective lens 9, and is irradiated onto a DVD disk 10. The light that is reflected/diffracted by the DVD disk 10 again passes through the objective lens 9, the ¼ wavelength plate 8 and the wavelength filter 7, passes through the beam splitter 6, is diffracted by a hologram 11 so as to be converted to convergent light and is focused on a photodetector 12.

Next, the case in which a CD disk is reproduced is described. Light that is generated from the infrared semiconductor laser 3 is reflected by the wavelength selection beam splitter 4, and is converted to parallel light by the collimating lens 5. The light that has been converted to parallel light is reflected by the beam splitter 6, passes through the wavelength filter 7 and the ¼ wavelength plate 8, is converted to converging light by the objective lens 9 and is irradiated onto a CD disk 13. The light that is reflected by the CD disk 13 passes again through the objective lens 9, the ¼ wavelength plate 8 and the wavelength filter 7, passes through the beam splitter 6, is diffracted by the hologram 11 to be converted to convergent light, and is focused on the photodetector 12.

As shown in FIG. 19A, the hologram 11 is divided into a plurality of regions, and one part of the regions (H1) guides only red light to the photodetector 12 and the other part of the regions (H2) guides only infrared light to the photodetector 12. In doing so, both regions cause the light to converge, as well as impart astigmatic aberration. As shown in FIG. 19B, the photodetector 12 has four detection regions. The light having astigmatic aberration is irradiated onto the center of the four detection regions.

In this mode, a focus error signal for the astigmatic aberration method is created by the difference between a sum of diagonally opposite regions (A+C) and a sum of the other diagonally opposite regions (B+D), of the four detection regions. Furthermore, for a tracking signal, a tracking error signal according to the push pull method is created from the difference between a sum of the regions on the same side (A+B) with respect to the track projection and a sum of the regions on the other side (C+D).

Furthermore, a tracking error signal for the phase differential method is created by comparing the phases of the sum of the diagonally opposite regions (A+C) with phases of the sum of the other diagonally opposite region (B+D). Moreover, an RF signal, which is a reproduction signal, is created from the sum of the entire region.

It is required that this optical head device reliably detect information recording media, whose applicable wavelengths differ and which include multi-layer disks, using a minimum of photodetectors.

However, in this configuration, when reproducing multi-layer disks such as dual-layer disks, scattered light from layers that are not the layer that is to be read is incident on the photodetector, accordingly these offset the original signal, and thus there has been the problem that a reliable signal could not be detected. In this case, it has been necessary to increase the number of photodetectors in order to avoid scattered light.

Patent Reference 1

JP 2002-216385A (First diagram)

DISCLOSURE OF INVENTION

It is an object of the present invention to solve the above problem. The present invention provides an optical head that reliably can record and reproduce information even when recording and reproducing multi-layer disks of different varieties.

In order to achieve the above-noted object, the optical head of the present invention includes a first light source that emits light of a first wavelength for at least either one of recording and reproducing information of a first information recording medium, a second light source that emits light of a second wavelength for at least either one of recording and reproducing information of a second information recording medium, an optical element for diffracting light of the first and the second wavelength, and a photodetector that is provided with a detection region for detecting light that is reflected by the first information recording medium or the second information recording medium, and that passes through the optical element, wherein the first information recording medium and the second information recording medium are multi-layer disks having at least two layers, wherein the detection region includes a first diffracted light detection region for detecting first and higher order diffracted light of the first wavelength that is diffracted by the optical element, and a second diffracted light detection region for detecting first and higher order diffracted light of the second wavelength that is diffracted by the optical element, wherein the first diffracted light detection region is arranged such that it does not straddle across a region that is divided by a maximum range or a minimum range of the dilation of zero order light coming from the first information recording medium that comes from a recording layer that differs from the recording layer that is to be recorded or reproduced, and wherein the second diffracted light detection region is arranged such that it does not straddle across a region that is divided by a maximum range or a minimum range of the dilation of zero order light coming from the second information recording medium that comes from a recording layer that differs from the recording layer that is to be recorded or reproduced.

A first optical disk apparatus of the present invention includes an optical head of the present invention, and a rotating system and a movement system for moving the first and the second information recording medium relative to the optical head.

A second optical disk apparatus of the present invention is dedicated for reproduction, and includes an optical head of the present invention, a rotating system and a movement system for moving the first and the second information recording medium relative to the optical head, and reproducer for reproducing information from signals output from the photodetector.

A third optical disk apparatus of the present invention is a apparatus for at least either one of recording and reproducing images from the first and the second information recording medium, and includes an optical head of the present invention, and a rotating system and a movement system for moving the first and the second information recording medium relative to the optical head.

A fourth optical apparatus of the present invention is a reproduction dedicated optical disk apparatus for reproducing images from the first and the second information recording medium, and includes an optical head of the present invention, and a rotating system and a movement system for moving the first and the second information recording medium relative to the optical head.

Furthermore, a computer of the present invention is provided with an optical disk apparatus of the present invention as an external memory apparatus.

Furthermore, a server of the present invention is provided with an optical disk apparatus of the present invention as an external memory apparatus.

Furthermore, a car navigation system of the present invention is provided with an optical disk apparatus of the present invention as an external memory apparatus.

BEST MODE FOR CARRYING OUT THE INVENTION

Figure 1A:
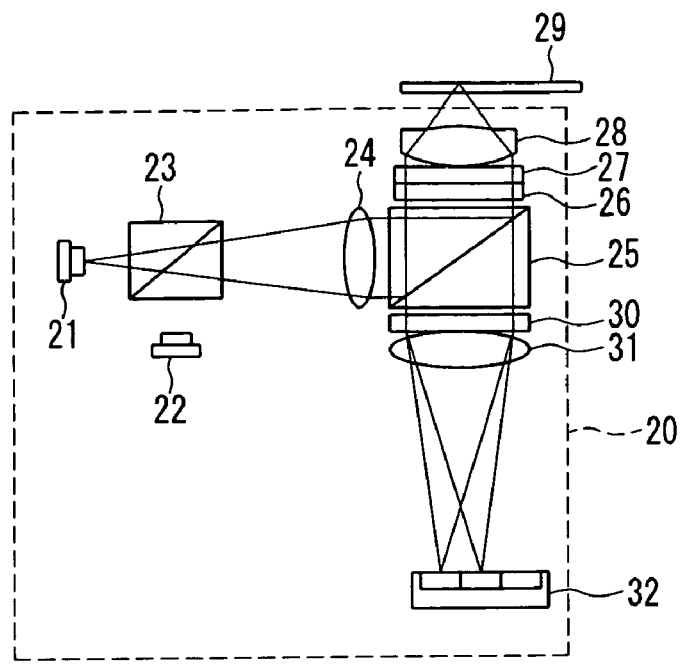
FIG. 1A is a diagram for explaining operations when a first light source is used in an optical head according to Embodiment 1 of the present invention.

With the present invention, information reliably can be recorded and reproduced even when recording and reproducing multi-layer disks of different varieties.

In the optical head of the present invention, it is preferable that at least one of the first diffracted light detection regions is outside a first maximum range, which is the maximum range of the dilation of zero order light coming from the first information recording medium that comes from a recording layer that differs from the recording layer that is to be recorded or reproduced, and that at least one of the second diffracted light detection regions is outside a second maximum range, which is the maximum range of the dilation of zero order light coming from the second information recording medium that comes from a recording layer that differs from the recording layer that is to be recorded or reproduced. With this configuration, it is possible to avoid the effect of scattered light from other layers of the multi-layer disk, and thus information reliably can be recorded and reproduced.

Furthermore, it is preferable that the optical element that diffracts light of the first wavelength and the optical element that diffracts light of the second wavelength are separate elements, that there is a shared region that is shared by both the first diffracted light detection region and the second diffracted light detection region, and that the shared region is arranged outside the larger range of the first maximum range and the second maximum range. With this configuration, the pattern of the optical element can be optimized for light of different wavelengths and it is also possible to share detection regions, and thus the area of the photodetectors can be decreased and the structure can be simplified.

Furthermore, is it preferable that at least one of the first diffracted light detection regions and at least one of the second diffracted light detection regions are arranged on the inside of the smaller of a first minimum range, which is the minimum range of the dilation of zero order light coming from the first information recording medium that comes from a recording layer that differs from the recording layer that is to be recorded or reproduced, and a second minimum range, which is the minimum range of the dilation of zero order light coming from the second information recording medium that comes from a recording layer that differs from the recording layer that is to be recorded or reproduced. With this configuration, the offset due to scattered light is about the same when either recording or reproducing both information recording media, and thus if the amount of the effect due to other layer scattered light is calculated in advance and set so as to be eliminated, then the information on both information recording media can be recorded and reproduced reliably.

Furthermore, it is preferable that both of all the first diffracted light detection region and all the second diffracted light detection region are arranged inside the smaller range of the first minimum range and the second minimum range.

Furthermore, it is preferable that the first diffracted light detection region and the second diffracted light detection region are coupled electrically. With this configuration, it is possible to share an I-V amp between the first and the second information recording medium, and to simplify the electric circuit.

An embodiment of the present invention is described below with reference to the drawings. In the diagrams below, the same symbols have been attached to the same configurations and elements performing the same operation.

Embodiment 1

Figure 1B:
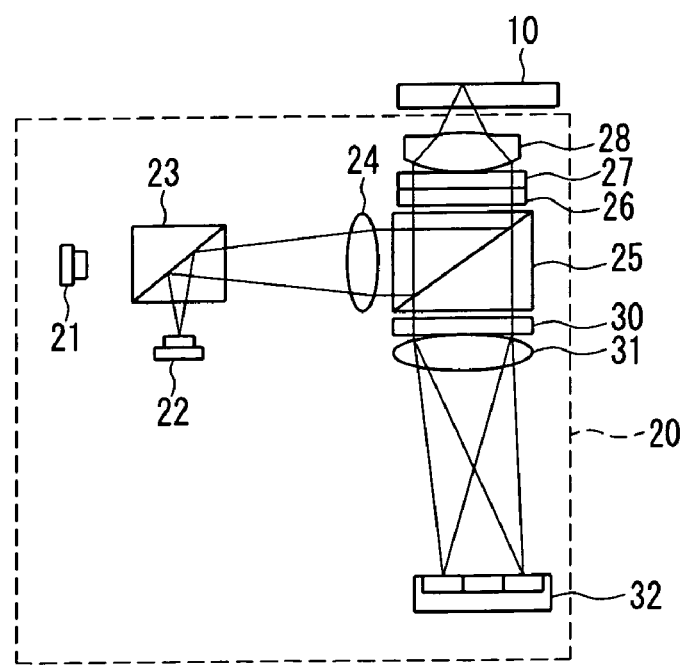
FIG. 1B is a diagram for explaining operations when a second light source is used in the optical head according to Embodiment 1 of the present invention.

FIG. 1 shows a structural overview of an optical head 20 according to the present embodiment. FIG. 1A shows a state in which a high density disk that has a thin substrate thickness (first information recording medium) is recorded and reproduced, and FIG. 1B shows a state in which a DVD disk (second information recording medium) is recorded and reproduced. The optical head 20 is provided with two types of light source, a blue semiconductor laser (first wavelength light source) 21 whose wavelength is about 400 nm (380 nm-420 nm) and a red semiconductor laser (second wavelength light source) 22 whose wavelength is 630 nm-680 nm.

It should be noted that recording and reproduction means at least one of either recording and reproduction, for example the optical head 20 may be dedicated to reproduction only, or may be used for both recording and reproduction. This fact is also the same in the following descriptions.

In FIG. 1A, a light of λ1 that is emitted from the blue semiconductor laser 21 passes through a wavelength selection prism 23, and is converted to parallel light by a collimating lens 24. The light that is converted to parallel light is reflected by a beam splitter 25, passes through a wavelength filter 26 and a ¼ wavelength plate 27, is converted to convergent light by an objective lens 28, which is a focusing means, and is irradiated onto a high density disk 29.

Here, it has been assumed that the numerical aperture (NA) of the objective lens 28 is 0.85, and that the substrate thickness of the high density disk 29 is 0.1 mm. The objective lens 28 is designed such that aberration is at a minimum when the blue light of wavelength λ1 is irradiated onto a disk having a substrate thickness of 0.1 mm. The light that is reflected, diffracted and modulated by the high density disk 29 passes again through the objective lens 28, the ¼ wavelength plate 27 and the wavelength filter 26, and passes through the beam splitter 25. One part of the light is diffracted by a hologram (optical element) 30, converted to convergent light by a detection lens 31 and is incident on a photodetector 32, which is a light detector. The photodetector 32 has a plurality of photodetection regions, and outputs a signal in accordance with the quantity of light that is received.

FIG. 1B is described next. A light of wavelength λ2 that is emitted from the red semiconductor laser 22 is reflected by the wavelength selection prism 23 and is converted to parallel light by the collimating lens 24. The light that is converted to parallel light is reflected by the beam splitter 25, passes through the wavelength filter 26 and the ¼ wavelength plate 27, is converted to convergent light by the objective lens 28, and is irradiated onto the DVD disk 10.

Here, the numerical aperture (NA) of the light that is irradiated from the objective lens 28 is restricted to 0.6 by the wavelength filter 26. The substrate thickness of the DVD disk 10 is 0.6 mm. The light that is reflected, diffracted and modulated by the DVD disk 10 passes again through the objective lens 28, the ¼ wavelength plate 27 and the wavelength filter 26, and passes through the beam splitter 25. One part of the light is diffracted by the hologram 30, converted to convergent light by a detection lens 31 and is incident on the photodetector 32. The photodetector 32 has a plurality of photodetection regions, and outputs a signal in accordance with the quantity of light that is received.

Figure 2A:
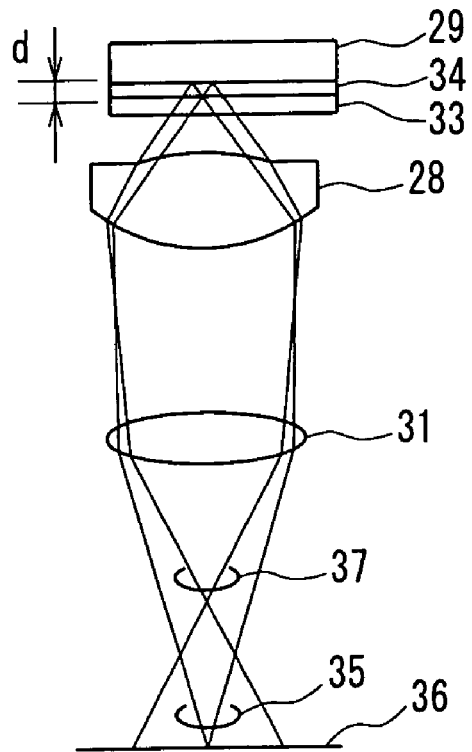
FIG. 2A is a diagram showing the state of the light when recording and reproducing dual-layer disks in the optical head according to Embodiment 1 of the present invention.

FIG. 2A is a simplified view of the state of the light when recording and reproducing dual-layer disks. The high density disk 29 is provided with a first recording layer 33 and a second recording layer 34. FIG. 2A shows a state in which the light that comes from the objective lens 28 is focused on the first recording layer 33. The light that is reflected from the first recording layer 33 passes again through the objective lens 28, is focused by the detection lens 31 and is focused onto a light receiving surface 36, as shown by a light beam 35.

On the other hand, part of the light that passes through the first recording layer 33 is reflected by the second recording layer 34, passes through the objective lens 28, and is focused by the detection lens 31. This light is scattered light (referred to below as "other layer scattered light") 37. As shown in FIG. 2A, the other layer scattered light 37 is focused in front of the light receiving surface 36, and it is light that spreads over the light receiving surface 36.

Figure 2B:
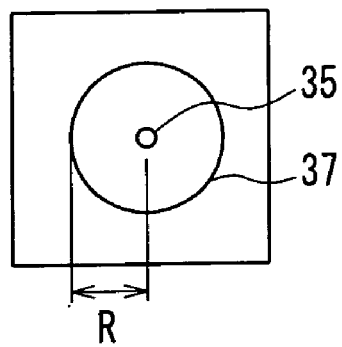
FIG. 2B is a front view of light beams on a light receiving surface of FIG. 2A.

FIG. 2B shows a front view of the light beams on the light receiving surface. The light beam 35 is focused, however the other layer scattered light 37 is dilated. The other layer scattered light is dilated substantially circularly, and its radius is R. R can be represented substantially as in Expression (1) below in terms of an optical distance d between the first recording layer 33 and the second recording layer 34, a focal length Fo and numerical aperture NA of the objective lens 28, and the focal length Fd of the detection lens 31. "Substantially" means that R is not limited only to cases in which it is absolutely the same as the right hand side of the expression below, but also means that it includes cases in which R is about the same.

$$R = d \cdot NA \cdot Fd / Fo \qquad \text{Expression (1)}$$

Here, Fo=2 mm, Fd=40 mm, NA=0.85, the refractive index of the substance between the dual layers of the high density disk is 1.6 and the interlayer thickness is taken to be 20-30 µm as per the standard. When the interlayer thickness is at its minimum value of 20 µm, d=20/1.6, and thus when the values are substituted into Expression (1), the minimum value of the radius R is 213 µm. In the same way, when the interlayer thickness is at the maximum value of 30 µm, d=30/1.6, and the maximum radius R is 319 µm.

Next, in the case of the DVD disk, according to the standard, the interlayer thickness is 55±15 µm and the refractive index is 1.55±0.10. When the refractive index of the substance between the dual layers is 1.65, which is the standard maximum value, and the interlayer thickness is 40 µm, which is the minimum value according to the standard, d=40/1.65. When the NA of the DVD disk during recording and reproduction is 0.6, and the previous values are substituted into Expression (1), the minimum value of the radius R is 290 µm.

In the same way, when the refractive index of the substance between the dual layers is 1.45, which is the minimum value in the standard, and the interlayer thickness is 70 µm, which is the maximum value in the standard, d=70/1.45 and the maximum value of the radius R is 579 µm.

The dual-layer disk is made such that the reflectance of the first recording layer 33 and that of the second recording layer 34 are substantially the same. That is to say, the film reflectance of the first recording layer 33 is substantially the same as the product of the film reflectance of the second recording layer 34 times the square of the transmittance of the first recording layer 33.

Thus, light that is reflected by the recording layer that is different from the recording layer that is to be recorded or reproduced becomes the other layer scattered light. The other layer scattered light is weaker than the light that is to be reproduced by the amount that the radius R dilates. However it affects a large area, and if a part of the light enters the detection area due to diffraction by a hologram, for example, then a signal corresponding to the other layer scattered light 37 is included in the signal that is output from the photodetection area and this is external noise that cannot be ignored.

In particular, if the other layer scattered light is incident on a part of the detection region, and if the amount of light that is incident on the detection region changes due to fluctuations in the tilt of the disk, lens shift or interlayer thickness, then the offset due to the scattered light changes, and may be a factor in causing instability in the recording and reproduction of information. The radius R is a function of the optical distance between the layers, as noted above, and the allowable range of this value is determined by the standard (format) of the optical disk that is to be reproduced. Consequently, if the optical system is known, then the maximum and minimum values of the range of the dilation radius of the other layer scattered light as calculated by the above-noted Expression (1) are determined by the tolerance range of the format.

Figure 3A:
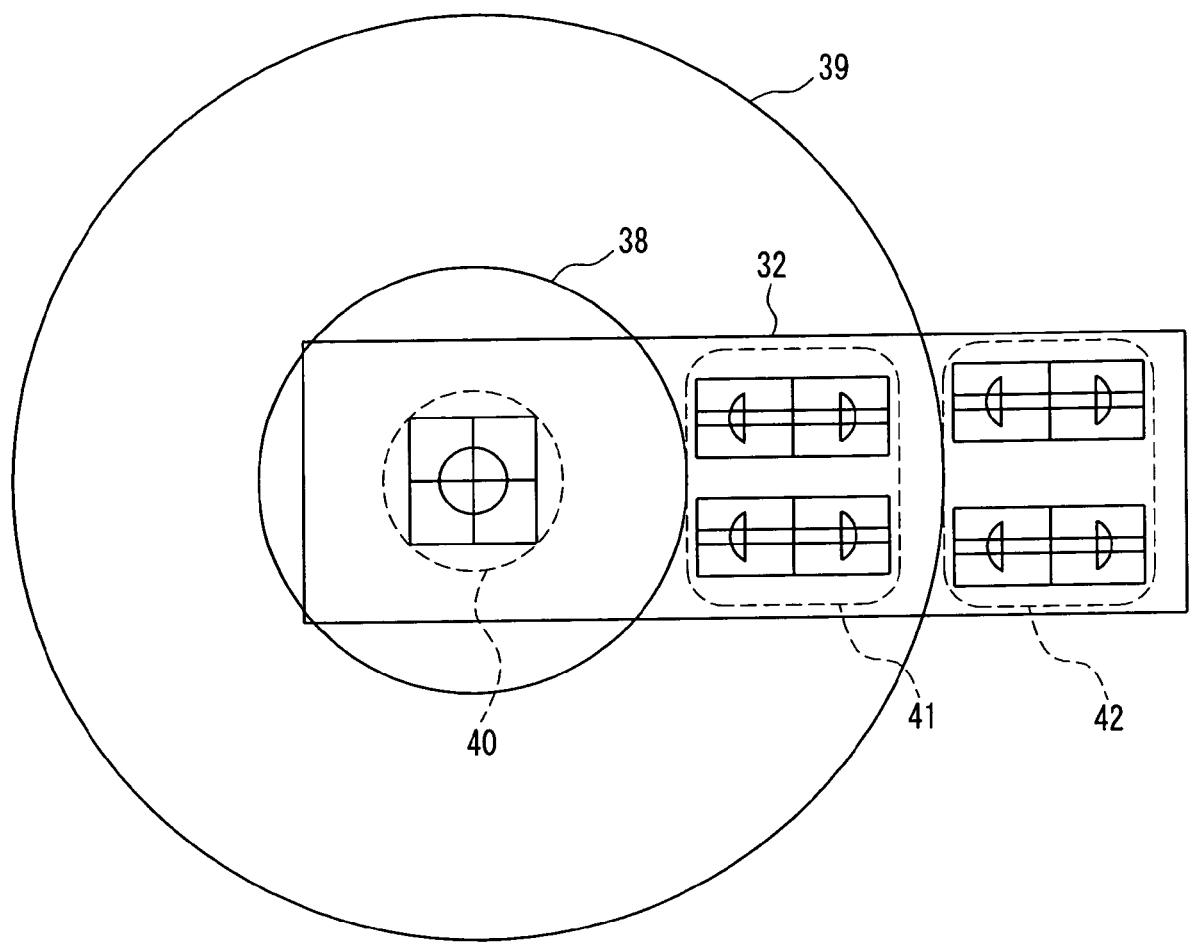
FIG. 3A is a front view of a photodetector used in the optical head of Embodiment 1.

FIG. 3A shows a front view of the photodetector 32. In FIG. 3A, numeral 38 denotes the standard maximum range of zero order other layer scattered light created by the hologram 30 when reproducing the high density disk 29, which is a dual-layer disk. Numeral 39 denotes the standard maximum range of zero order other layer scattered light created by the hologram 30 when reproducing the DVD disk 10, which is a dual-layer disk. In the case of the present embodiment, with the value calculated by the above-mentioned Expression (1), the maximum range 38 is a circular range having a radius of 319 μm. Furthermore, the maximum range 39 is a circular range having a radius of 579 μm.

A detection region 40 receives zero order light that is not diffracted by the hologram 30. The detection region 40 is used when reproducing the high density disk 29 and also when reproducing the DVD disk 10. A detection region 41 receives that light, of the light that is used when reproducing the high density disk 29, that is diffracted by the hologram 30. The detection region 41 is arranged on an outside region, such that it does not straddle across the outside region and an inside region defined by the standard maximum range 38 of the other layer scattered light of the high density disk 29. In the above-noted numerical example, the detection region 41 is arranged outside a range of at most 319 μm from the center of the detection region 40.

A detection region 42 receives that light, of the light that is used when reproducing the DVD disk 10, that is diffracted by the hologram 30. The detection region 42 is arranged on an outside region, such that it does not straddle across the inside region and an outside region defined by the standard maximum range 39 of the other layer scattered light of the DVD disk 10. In the above-noted numerical example, the detection region 42 is arranged outside a range of at most 579 μm from the center of the detection region 40. A RF signal, which is the signal for reproducing information, and four signals used for creating a tracking signal with the phase difference method are obtained from the detection region 40.

A focus signal (spot size detection method (SSD method)) and a tracking signal (push pull method) that are used when reproducing the high density disk 29 are obtained from the detection region 41. A focus signal (SSD method) and a tracking signal (push pull method) that are used when reproducing the DVD disk 10 are obtained from the detection region 42.

Figure 3B:
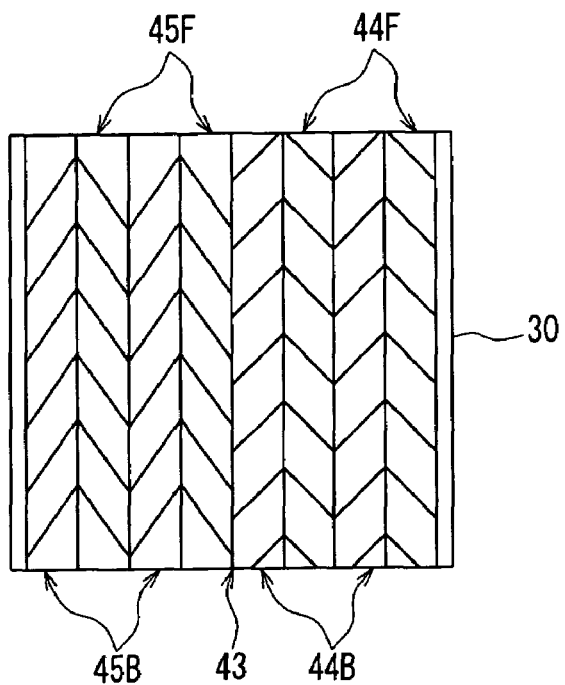
FIG. 3B is a front view of a hologram used in the optical head of Embodiment 1.

FIG. 3B schematically shows the hologram 30. The hologram 30 is divided into two regions about a central dividing line 43. The push pull method tracking signal is generated by differentiating between these two regions. A region on the right side of the dividing line 43 is divided into regions 44F and regions 44B, and the hologram 30 generates light that is focused in front of the light receiving surface and light that is focused behind the light receiving surface. A region on the left side of the dividing line 43 is divided into regions 45F and regions 45B, and the hologram 30 generates light that is focused in front of the light receiving surface and light that is focused behind the light receiving surface.

The focus signal is generated with the SSD method from the difference between the light focused on the front side and the light focused on the back side. The hologram 30 is used both when reproducing the high density disk 29 and when reproducing the DVD disk 10. In this case, the diffraction angle differs because the wavelength when reproducing the high density disk 29 differs from that when using the DVD disk 10. The light is distributed between the detection regions 41 and 42 by utilizing this difference. That is to say, the first order diffracted light from the blue laser used by the high density disk 29 is received by the detection region 41 and the first order diffracted light from the red laser used by the DVD disk 10 is received by the detection region 42.

As shown in FIG. 3A, with this configuration, it is possible to reduce external interference of the focus signal and the push pull tracking signal because the detection region 41 can be arranged outside of the standard maximum range 38 of the other layer scattered light when reproducing the high density disk 29. In addition, it is possible to reduce external interference of the focus signal and the push pull tracking signal because the detection region 42 can be arranged outside of the standard maximum range 39 of the other layer scattered light when reproducing the DVD disk 10.

Since the detection region 41 and the detection region 42 are independent, it is possible to optimize the detection region 41 for use with the high density disk 29, and to optimize the detection region 42 for use with the DVD disk 10.

Figure 3C:
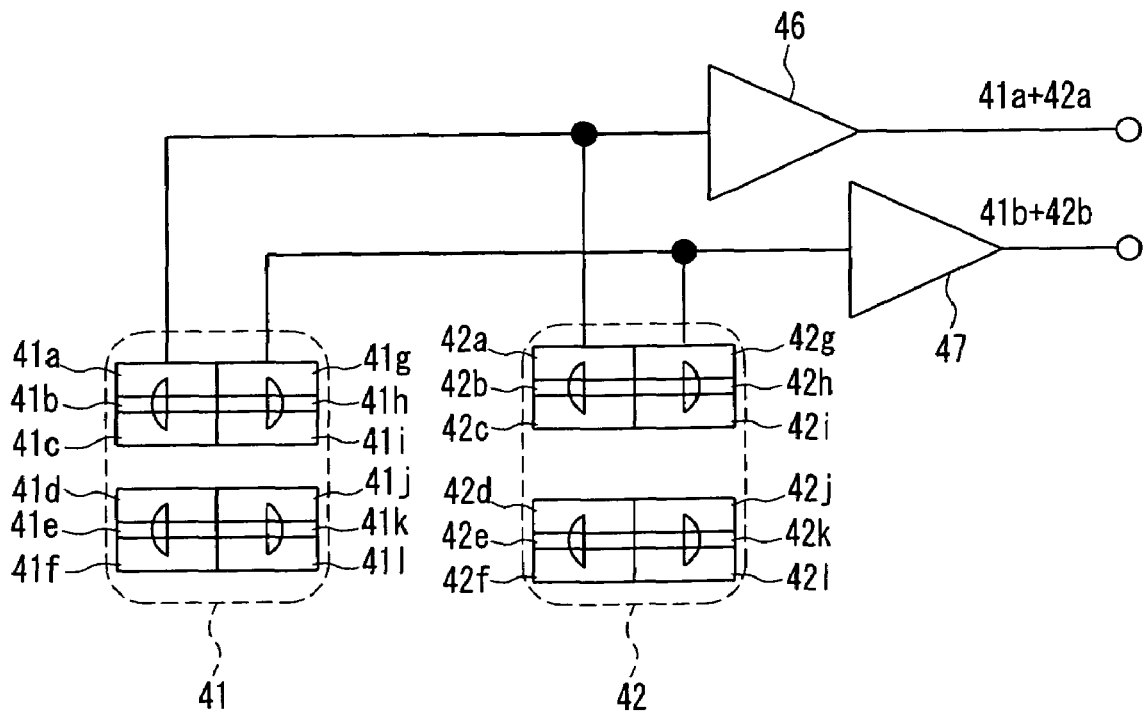
FIG. 3C is a structural diagram of detection regions and one part of a circuit of the photodetector used in the optical head of Embodiment 1.

FIG. 3C shows the detail of the detection region 41 and the detection region 42, and a structural view of part of a circuit. The detection region 41 is divided into 12 regions from a region 41a to a region 41l, and the detection region 42 is divided into 12 regions, from a region 42a to a region 42l. The region 41a and the region 42a are connected electrically, and the current signal that is output from the region 41a is added to the current signal that is output from the region 42a and input into an I-V amp (current/voltage converter) 46 and is output as a corresponding voltage signal.

Similarly, the current signal that is output from the region 41b is added to the current signal that is output from the region 42b, input to an I-V amp 47 and is output as a corresponding voltage signal. Although not illustrated, for the other regions 41c-41l, they are respectively electrically connected to the regions 42c-42l, and voltage signals are output from corresponding I-V amps in accordance with the amount of light. Further still, since the detection region 41 is independent from the detection region 42, the detection region 41 can be optimized for reproducing the high density disk 29 and the detection region 42 can be optimized for reproducing the DVD disk 10.

Since the detection region 41 and the detection region 42 are connected electrically, with this configuration it is possible to share the I-V amp when reproducing the high density disk 29 and when reproducing the DVD disk 10. That is to say, since the signal from the detection region 42 is zero when reproducing the high density disk 29, the I-V amp receives only the signal from the detection region 41. On the other hand, since the signal from the detection region 41 is zero when reproducing the DVD disk 10, the I-V amp receives only the signal from the detection region 42. With such sharing, it is not necessary to provide an independent I-V amp for the respective detection region 41 and 42, and thus the electrical circuit can be simplified.

Furthermore, since it is possible to reduce the number of signal lines that are output from the photodetector, the size of the photodetector package can be reduced, it is possible to miniaturize the optical head device and the optical information apparatus and to reduce costs.

Figure 4A:
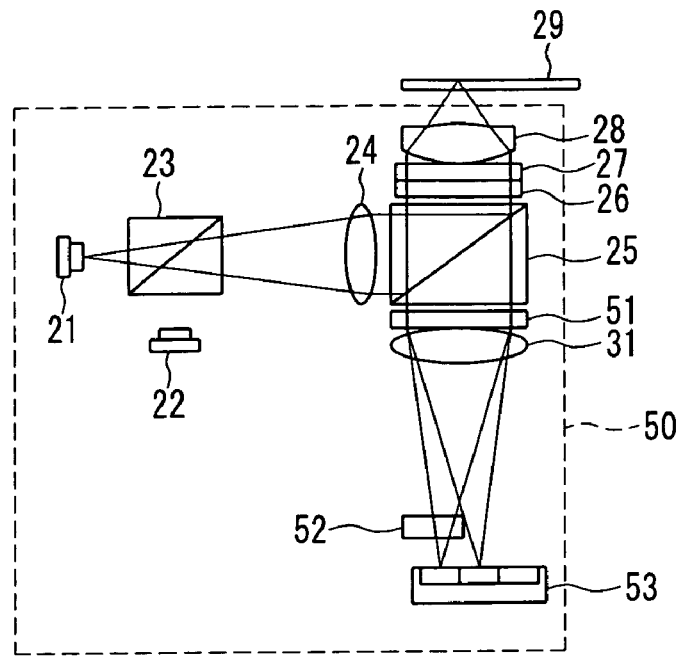
FIG. 4A is a diagram for explaining operations when the first light source is used in a separate example of the optical head of Embodiment 1 of the present invention.
Figure 4B:
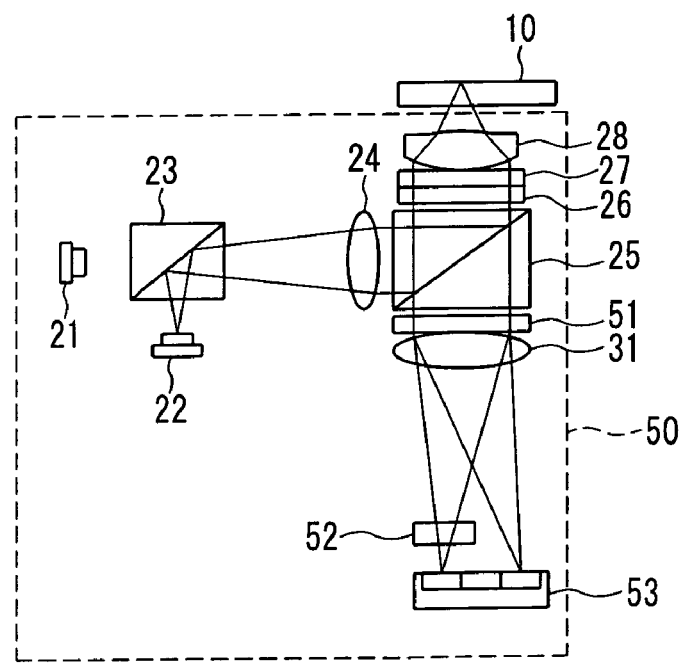
FIG. 4B is a diagram for explaining operations when the second light source is used in a separate example of the optical head of Embodiment 1 of the present invention.

FIG. 4 shows a structural view of an optical head 50 according to a separate example. FIG. 4A shows a state of recording and reproducing a high density disk, and FIG. 4B shows a state of recording and reproducing a DVD disk. The configuration differs from that of FIG. 1 in the use of a separate hologram 51 as a substitute for the hologram 30, in that a part of the zero order light of the hologram 51 is diffracted by a further separate hologram 52, and in that these are received by a photodetector 53.

Figure 5A:
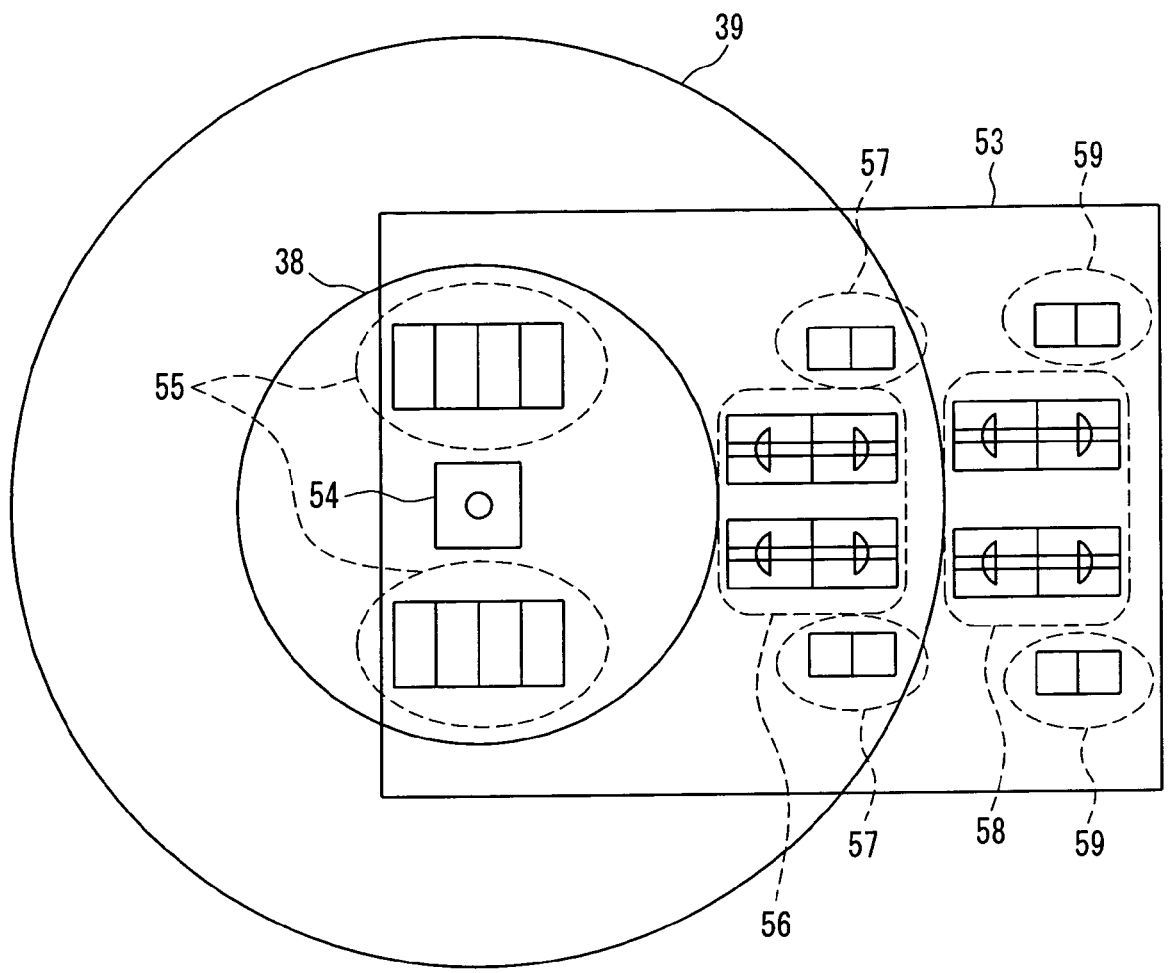
FIG. 5A is a front view of a photodetector used in a separate example of the optical head of Embodiment 1.

FIG. 5A shows a front view of the photodetector 53 shown in FIG. 4. A detection region 54 receives the zero order light that is not diffracted by both of the two holograms 51 and 52. The RF signal, which is the signal for reproducing the information, is obtained from the light that is detected by the detection region 54. The light that is not diffracted by the hologram 51 and that is diffracted by the hologram 52 is received on a photodetection region 55. Four signals used for creating tracking signals according to the phase shift method are obtained from the light received by the photodetection region 55. Because detection according to the phase shift method is not greatly affected by scattered light, the detection region 55 in the examples in FIGS. 4 and 5 is within the range of scattered light.

Detection regions 56 and 57 are arranged on an outside region such that they do not straddle across the outside region and an outside region defined by the standard maximum range 38 of the other layer scattered light of the high density disk 29. The detection regions 56 and 57 receive light that is diffracted by the hologram 51 when reproducing the high density disk 29. A focus signal (spot size detection method (SSD method)) and a tracking signal (push pull method) that are used when reproducing the high density disk 29 are obtained from the detection region 56. Furthermore, a signal for correction offset caused by lens shift of the tracking signal is obtained from the detection region 57.

Detection regions 58 and 59 are arranged on an outside region such that they do not straddle across the outside region and an inside region defined by the standard maximum range 39 of the other layer scattered light of the DVD disk 10. The detection regions 58 and 59 are arranged even further out, and receive light that is diffracted by the hologram 51 when reproducing the DVD disk 10. A focus signal (spot size detection method (SSD method)) and a tracking signal (push pull method) that are used when reproducing the DVD disk 10 are obtained from the detection regions 58 and 59.

Figure 5B:
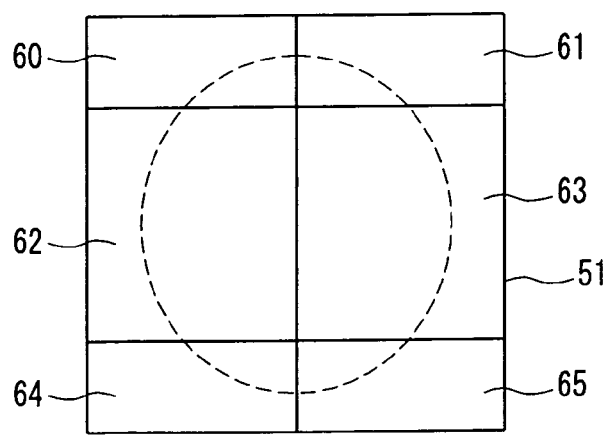
FIG. 5B is a front view of a hologram used in a separate example of the optical head of Embodiment 1.

FIG. 5B shows an overview of the hologram 51. The dotted line in FIG. 5B represents the shape of the light beam on the hologram 51. The hologram 51 is divided into six regions 60-65. When reproducing high density disks, the light of the regions 62 and 63 is diffracted to the detection region 56. Although not illustrated, the interior of the regions 62 and 63 is divided further into regions for forward focal point use and regions for rear focal point use. When reproducing high density disks, the light of the regions 60, 61, 64 and 65 is diffracted to the detection region 57. The regions 60, 61, 64 and 65 have substantially no push pull signal component but include a large change component due to lens shift. Thus, a signal for offset due to lens shift of the tracking signal can be obtained from the signal obtained from the detection region 57.

Figure 6A:
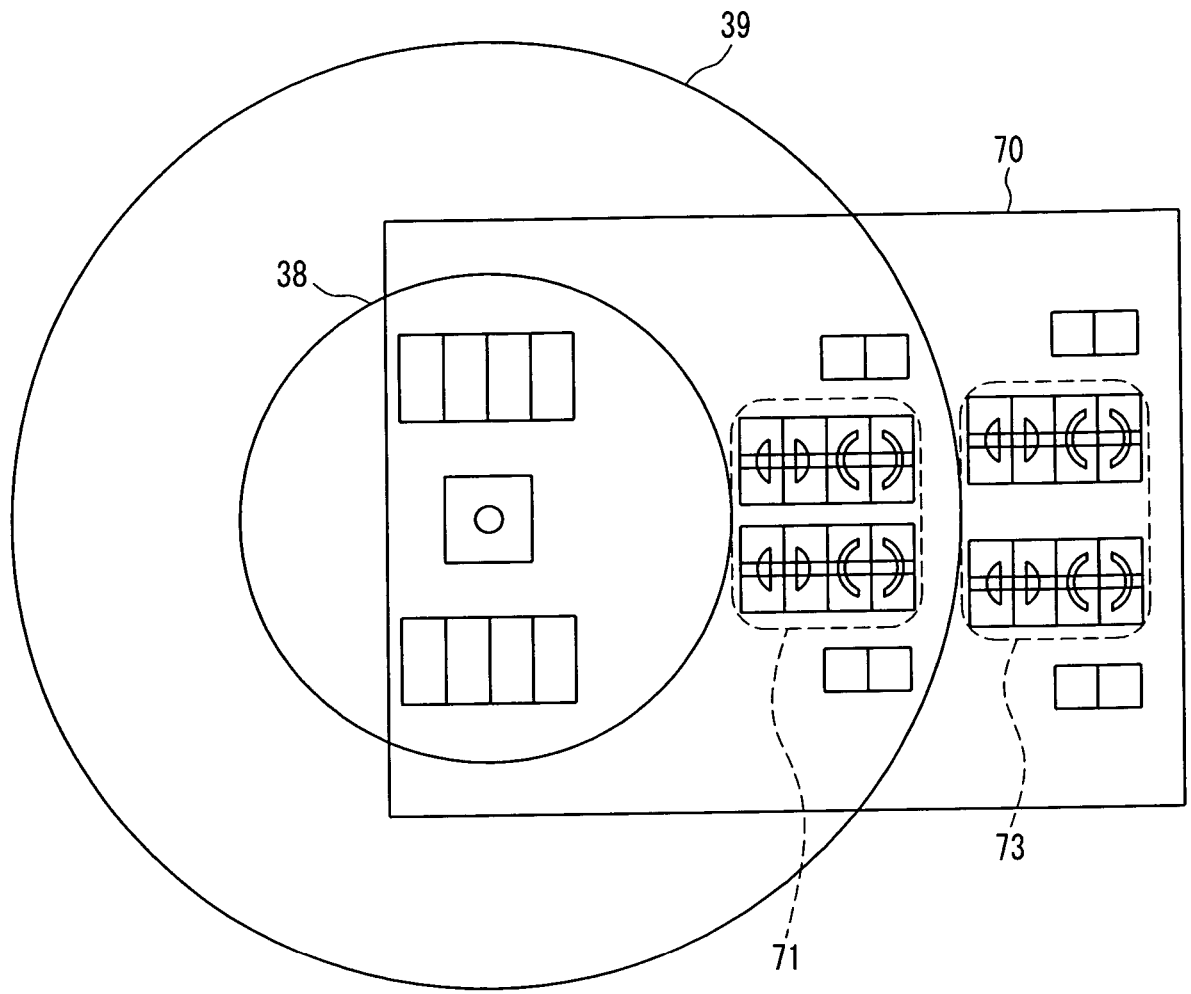
FIG. 6A is a front view of a photodetector used in a separate example of the optical head of Embodiment 1.

FIG. 6A shows a front view of a photodetector 70 according to another example. The photodetector 70 shown in FIG. 6A is a photodetector that is used as a substitute for the photodetector 53 in the configuration in FIG. 4. In addition, the photodetector 70 uses a hologram 72 shown in FIG. 6B as a substitute for the hologram 51. The differences of the photodetector 70 from the configuration shown in FIG. 5 are described below. A detection region 71 is arranged on an outside region such that it does not straddle across the outside region and an inside region defined by the standard maximum range 38 of the other layer scattered light of the high density disk 29. The detection region 71 receives that light, of the light that is used when reproducing the high density disk 29, that is diffracted by the hologram 72. A focus signal (spot size detection method (SSD method)), a tracking signal (push pull method) and also a spherical aberration detection signal that are used when reproducing the high density disk 29 are obtained from the detection region 71.

A detection region 73 is arranged on an outside region such that it does not straddle across the outside region and an inside region defined by the standard maximum range 39 of the other layer scattered light of the DVD disk 10. The detection region 73 receives that light, of the light that is used when reproducing the DVD disk 10, that is diffracted by the hologram. A focus signal (spot size detection method (SSD method)) and a tracking signal (push pull method) that are used when reproducing the DVD disk 10 are obtained from the detection region 73.

Figure 6B:
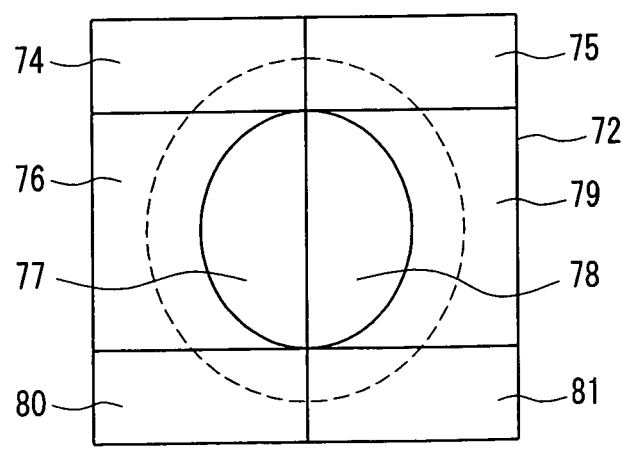
FIG. 6B is a front view of a hologram used in a separate example of the optical head of Embodiment 1.

FIG. 6B shows an overview of the hologram 72. The dotted line in FIG. 6B represents the shape of the light beam on the hologram 72. The hologram 72 is divided into eight regions 74-81. When reproducing high density disks, the light of the regions 76, 77, 78 and 79 is diffracted to the detection region 71. Although not illustrated, the interior of the regions 76-79 is further divided into regions for front focal point use and regions for rear focal point use. An inner circumferential focus signal is created from the regions 77 and 78 that are close to the center of the light beam, and an outer circumferential focus signal is created from the regions 76 and 79 that are further from the center. A spherical aberration detection signal is created from the differential signal of both these signals that are created, and a regular focus signal is created from a summation of the signals.

Figure 7A:
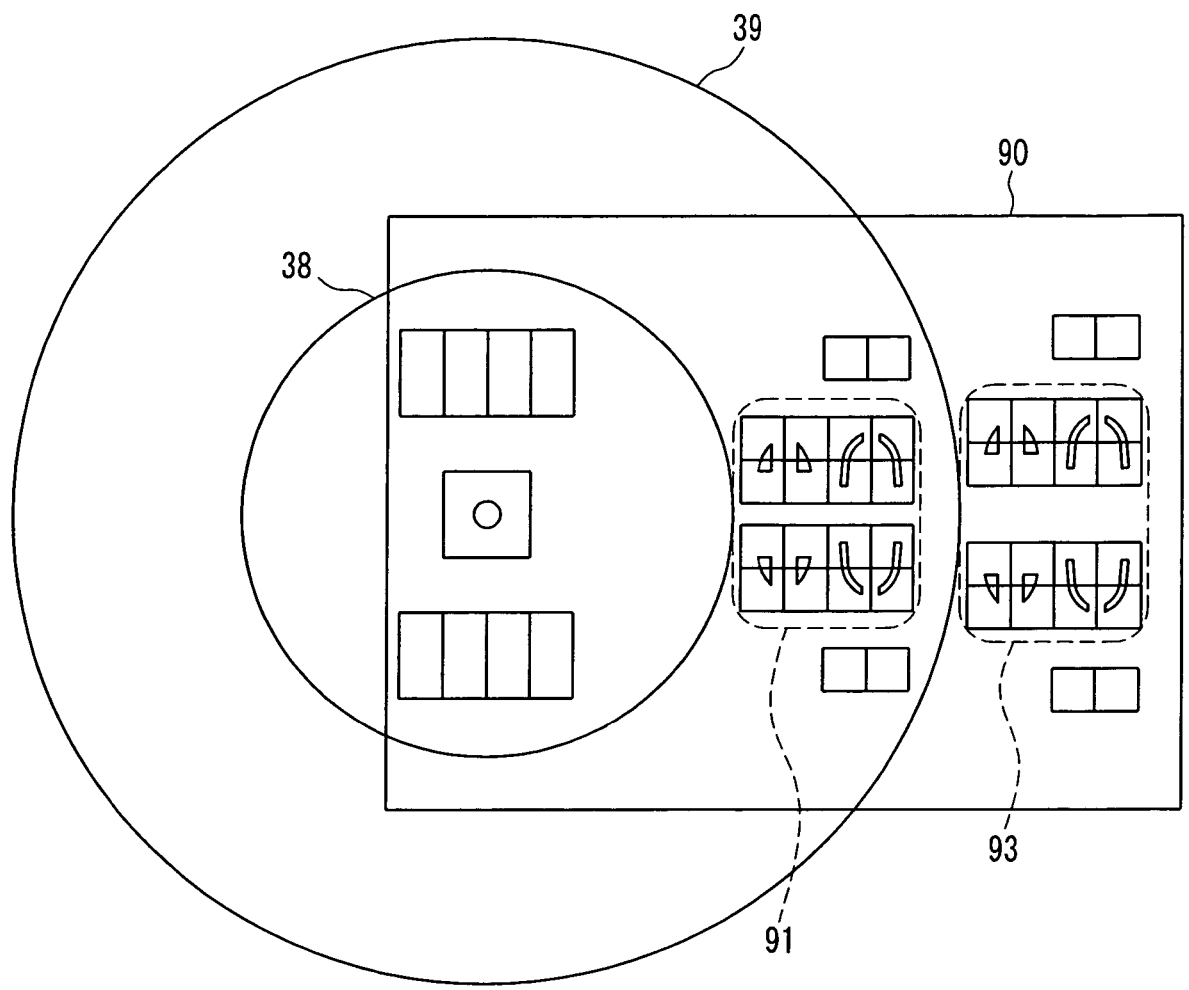
FIG. 7A is a front view of a photodetector used in a separate example of the optical head of Embodiment 1.

FIG. 7A shows a front view of a photodetector 90 according to still another separate example. The photodetector 90 shown in FIG. 7A is a photodetector that is used as a substitute for the photodetector 53 in the configuration in FIG. 4. In addition, the photodetector 90 uses a hologram 92 shown in FIG. 7B as a substitute for the hologram 51. The differences of the photodetector 90 from the configurations shown in FIGS. 5 and 6 are described below. A detection region 91 is arranged on an outside region such that it does not straddle across the outside region and an inside region defined by the standard maximum range 38 of the other layer scattered light of the high density disk 29. The detection region 91 receives that light, of the light that is used when reproducing the high density disk 29, that is diffracted by the hologram 92. A focus signal (spot size detection method (SSD method)), a tracking signal (push pull method) and also a spherical aberration detection signal that are used when reproducing the high density disk 29 are obtained from the detection region 91.

A detection region 93 is arranged on an outside region such that it does not straddle across the outside region and an inside region defined by the standard maximum range 39 of the other layer scattered light of the DVD disk 10. The detection region 93 receives that light, of the light that is used when reproducing the DVD disk 10, that is diffracted by the hologram 92. A focus signal (semicircle spot size detection method (SSD method)) and a tracking signal (push pull method) that are used when reproducing the DVD disk 10 are obtained from the detection region 93.

Figure 7B:
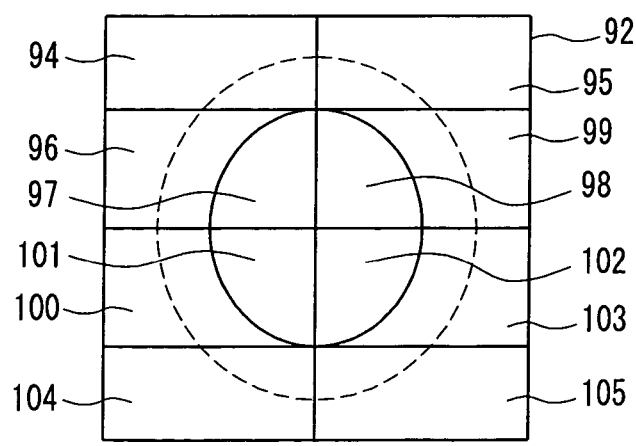
FIG. 7B is a front view of a hologram used in a separate example of the optical head of Embodiment 1.

FIG. 7B shows an overview of the hologram 92. The dotted line in FIG. 7B represents the shape of the light beam on the hologram 92. The hologram 92 is divided into twelve regions 94-105. When reproducing high density disks, the light of the regions 96-103 is diffracted to the detection region 91. The regions 96 and 100 are opposite each other. One of them makes a beam for a front focal point, and the other makes a beam for a rear focal point. This is the same relationship as with regions 97 and 101, regions 98 and 102 and regions 99 and 103.

An inner circumferential focus signal is created from the regions 97, 98, 101 and 102 that are close to the center of the light beam, and an outer circumferential focus signal is created from the regions 96, 99, 100 and 103 that are further from the center. A spherical aberration detection signal is created from the differential signal of both these signals that are created, and a regular focus signal is created from a summation of the signals.

With the present embodiment, even if optical disks of a different format include a dual-layer disk, it is possible to prevent the other layer scattered light of the dual layers from influencing the focus signal and the tracking signal, and information can be recorded and reproduced reliably. Moreover, since the photodetector may be made more compact, the cost of the optical head device and the optical information recording apparatus can be reduced.

In the present embodiment, since it is possible to utilize a focusing method in which the effect on focusing when transversing the tracks is small, such as the SSD method, it is also possible to record and reproduce information reliably, even in cases when the groove pitch is larger than the spot on the disk, such as with DVD-RAM.

The following is a supplement to the present embodiment, but is the same for Embodiment 2 and beyond. The focus signal, tracking signal and spherical aberration detection signal are not limited to the example shown here. In focusing, alternatively the signals may be combined with a knife edge method or a defocus knife edge method, and in tracking, the signals may be combined in, for example, a three beam method, or differential push pull method (DPP).

Furthermore, specific examples of the focal length of the objective lens and the focal length of the detection lens were given to give numerical values to the range of the other layer scattered light, however the present invention is not limited to these values. That is to say, the range of the other layer scattered light is determined appropriately from the optical system and the disk format that actually is used, according to the above-noted Expression (1), and the detection regions can be arranged in accordance with the range of the other layer scattered light that is calculated.

Furthermore, in the present embodiment, an example has been shown in which the detection regions for high density disks and the detection regions for DVD disks are coupled electrically. However, there is no limitation to this, and separate I-V amps may be provided to carry out the current/voltage conversion and the present embodiment may be configured with separate outputs. In this configuration, the error rate when reproducing information can be reduced since it is possible to optimize the conversion resistance of the I-V amp separately for the high density and for the DVD disks.

Furthermore, in the present embodiment, an example has been given in which blue (for example 405 nm) and red (630 to 680 nm) are the wavelengths, however, the effect of the present invention is not limited to this combination of wavelengths. That is to say, the wavelength combination may differ from the example of the present invention, and the present embodiment may be configured to use disks of a disk format that corresponds to the wavelengths.

Furthermore, in the present embodiment, an example has been given of using a wavelength filter and a ¼ wavelength plate to make disks having different substrate thicknesses compatible, however the effect of the present invention is not limited to this. The present invention can also be applied to methods using dichro-holograms and to cases using phase steps.

Moreover, the first embodiment has been described using first order diffracted light, however the diffracted light may be second or higher order light. First order light is the lowest order diffracted light, and the diffraction angle increases with increasing order.

Embodiment 2

Embodiment 2 is an example in which the detection region that receives the light used for the focus signal is continually within the range of the scattered light. The optical configuration of Embodiment 2 has substantially the same configuration as that of FIG. 1, but as the photodetector, a photodetector 110 shown in FIG. 8A is substituted for the photodetector 32 of FIG. 1, and a hologram 111 shown in FIG. 8B is used as a substitute for the hologram 30.

Figure 8A:
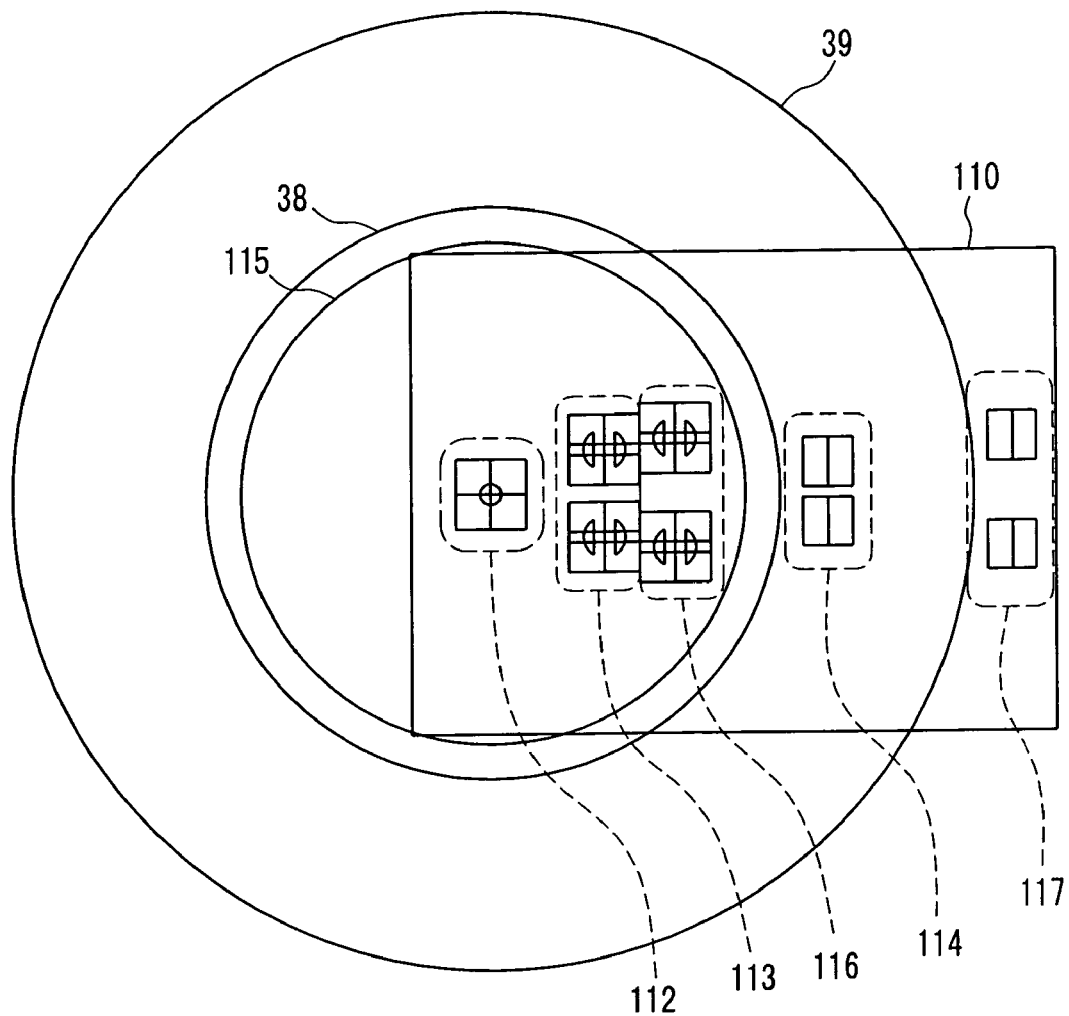
FIG. 8A is a front view of a photodetector used in an optical head of Embodiment 2.
Figure 8B:
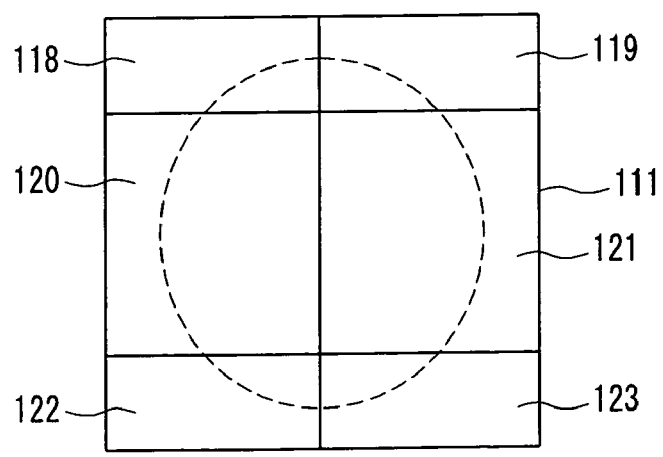
FIG. 8B is a front view of a hologram used in the optical head of Embodiment 2.

FIG. 8A shows a front view of the photodetector 110. A detection region 112 receives zero order light that is not diffracted by the hologram 111. The detection region 112 is used when reproducing the high density disk 29 and when reproducing the DVD 10. That light, of the light used when reproducing the high density disk 29, that is diffracted by the hologram 111 is received by detection regions 113 and 114.

The detection region 113 is arranged on an inside region such that it does not straddle across an outside region and the inside region defined by a standard minimum range 115 of the other layer scattered light of the high density disk 29. The detection region 114 is arranged on an outside region such that it does not straddle across the outside region and an inside region defined by the standard maximum range 38 of the other layer scattered light of the high density disk 29.

Detection regions 116 and 117 receive that light, of the light that is used when reproducing the DVD disk 10, that is diffracted by the hologram 111. The detection region 116 is arranged on the inside region such that it does not straddle across an outside region and the inside region defined by the standard minimum range 115 of the other layer scattered light of the high density disk 29. The detection region 117 is arranged on an outside region such that it does not straddle across the outside region and an inside region defined by the standard maximum range 39 of the other layer scattered light of the DVD disk 10. RF signal, which is the signal for reproducing the information, and four signals used for creating tracking signal according to the phase differential method are obtained from the detection region 112.

A focus signal (spot size detection method (SSD method)) and a tracking signal (push pull method) that are used when reproducing the high density disk 29 are obtained from the detection region 113. A signal for correcting offset due to lens shift of the tracking signal is obtained from the detection region 114. Furthermore, a focus signal (SSD method) and a tracking signal (push pull method) that are used when reproducing the DVD disk 10 are obtained from the detection regions 116 and 117.

FIG. 8B shows an overview of the hologram 111. The dotted line in FIG. 8B represents the shape of the light beam on the hologram 111. The hologram 111 is divided into six regions 118-123. When reproducing high density disks, the light of the regions 120 and 121 is diffracted to the detection region 113. Although not illustrated, the interior of the regions 120 and 121 further is divided into regions for forward focal point use and regions for rear focal point use.

When reproducing high density disks, the lights of the regions 118, 119, 122 and 123 are diffracted to the detection region 114. The regions 118, 119, 122 and 123 have substantially no push pull signal component but include a large change component due to lens shift. Thus, a signal for correcting offset due to lens shift of the tracking signal can be obtained from the signal obtained from the detection region 114.

Here, Fo=2 mm, Fd=40 mm, NA=0.85, the refractive index of the substance between the dual layers of the high density disk is 1.6 and the interlayer thickness is taken to be a minimum of 20 μm as per the standard. In this case, d=20/1.6, and thus when these numerical values are substituted into Expression (1), the value of the radius R is 213 μm. Next, in the case of the DVD disk, when the refractive index is the standard maximum value of 1.65, and the interlayer thickness is the standard minimum of 40 μm, d=40/1.65. When the NA during recording and reproduction of the DVD disk is set to 0.6 and the preceding numerical values are substituted into Expression (1), the minimum value of the radius R is 290 μm.

Consequently, the standard minimum range of other layer scattered light of high density disks is a circle with a radius of 213 μm. Because this is smaller than 290 μm, which is the minimum standard range of other layer scattered light in the case of DVD disks, the minimum range 115 is the range of the smaller minimum range of either standard.

When the present embodiment is used, the photodetection region for obtaining the signal for focusing is within the range of the other layer scattered light of dual-layer disks, both when reproducing high density disks and when reproducing DVD disks. Thus, offset due to scattered light exists when reproducing either of the disks, however even if there is a change between the interlayer thickness of the dual-layer disks, the change in offset is small. That is to say, the offset when reproducing both disks is about the same, and provided that the amount of the effect caused by the other layer scattered light is calculated in advance and removed, then even if optical disks of different formats include dual-layer disks it is possible to record and reproduce information reliably.

Furthermore, even in this embodiment it is possible to utilize a focus method in which the effect on focus when transversing tracks is small, such as the SSD method, and thus it is possible to record and reproduce information reliably even in cases, such as with DVD-RAM, in which the groove pitch is larger than the spot on the disk.

In this configuration, it is possible to join electrically the elements that correspond to the detection region 113 for use with the high density disk, and the detection region 116 for use with the DVD disk. Thus, the number of amps for changing current signal that come from the detection regions into voltage signals, and the number of signal lines can be reduced. Thus, it is possible to lower the cost of optical heads and optical disk apparatuses that use this configuration.

Embodiment 3

Figure 9A:
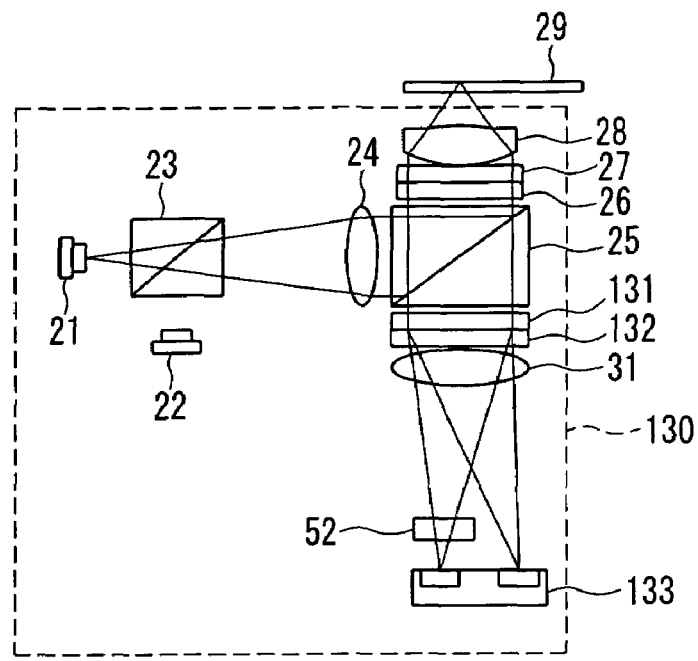
FIG. 9A is a diagram for explaining the operations of the optical head of Embodiment 3 of the present invention with respect to a first information recording medium.
Figure 9B:
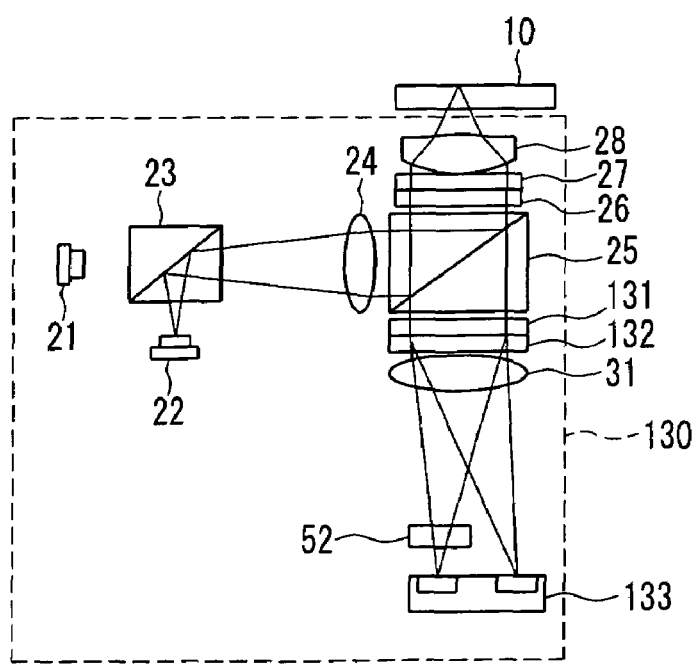
FIG. 9B is a diagram for explaining the operations of the optical head of Embodiment 3 of the present invention with respect to a second information recording medium.

Embodiment 3 shows an example of sharing a photodetector when reproducing high density disks and when reproducing DVD disks. FIG. 9 shows a structural overview of an optical head 130 of the present embodiment. The present embodiment differs from Embodiment 1 in that two individually separate holograms, a hologram 131 and a hologram 132 are used as a substitute for the hologram 30. The hologram 131 diffracts only light of the wavelength of the blue semiconductor laser 21, and does not diffract light of the wavelength of the red semiconductor laser 22. On the other hand, the hologram 132 diffracts only light of the wavelength of the red semiconductor laser 22 and does not diffract the light of the wavelength of the blue semiconductor laser 21. Light that is diffracted by the holograms 131 and 132, as well as zero order light, is received by a photodetector 133.

Figure 10A:
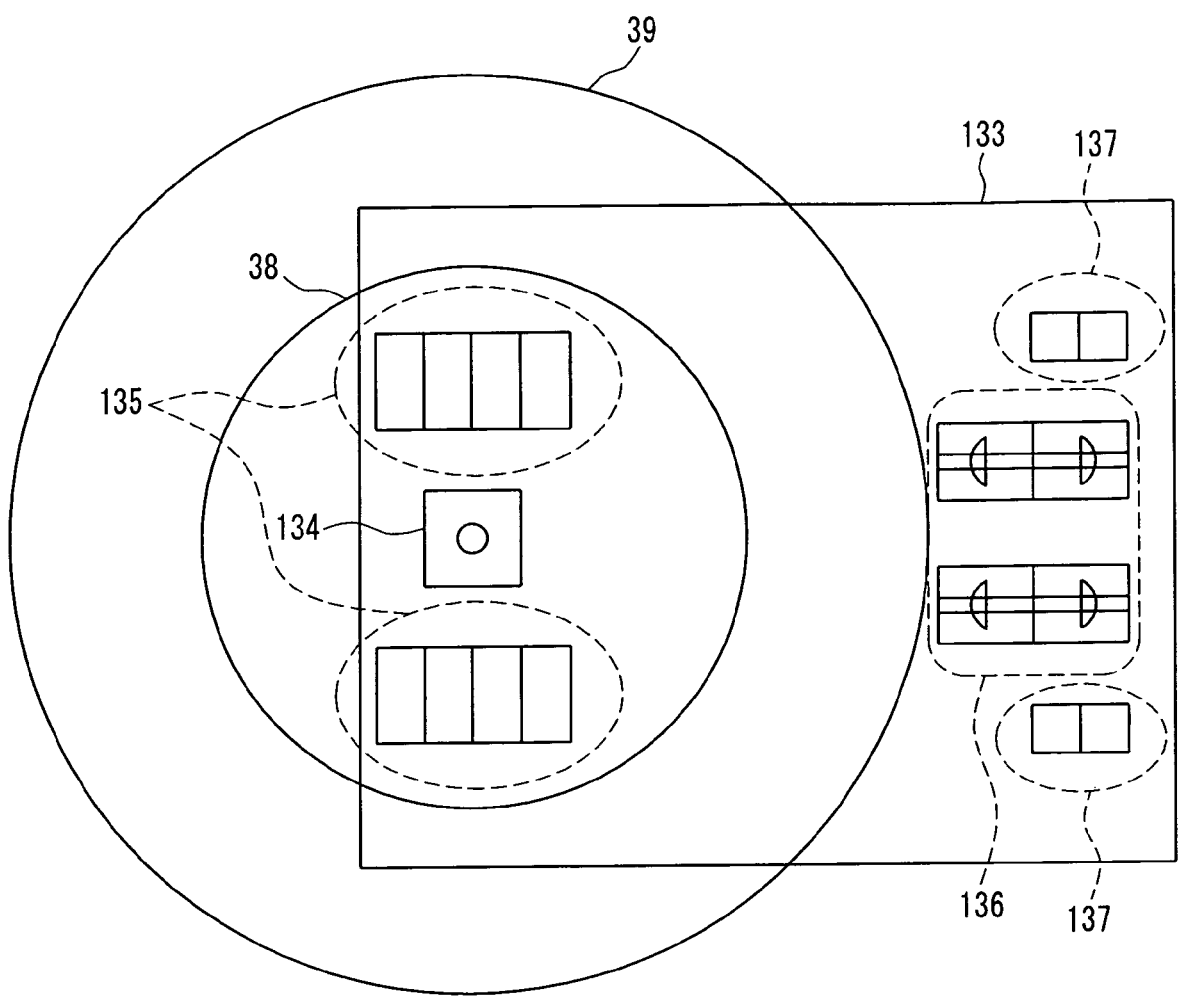
FIG. 10A is a front view of a photodetector used in the optical head of Embodiment 3.

FIG. 10A shows a front view of the photodetector 133. A detection region 134 receives zero order light that is not diffracted by the three holograms 131, 132 and 52. The RF signal, which is a signal for reproducing the information, is obtained from the light that is detected at the detection region 134. The light that is not diffracted by the holograms 131 and 132, but that is diffracted by the hologram 52 is received by a detection region 135. The four signals used for creating a tracking signal according to the phase shift method are obtained from the light that is received by the detection regions 135. Detection regions 136 and 137 are arranged on an outside region such that they do not straddle across the outside region and an inside region defined by the standard maximum range 39 of the other layer scattered light of the DVD disk 10. The detection regions 136 and 137 receive that light, of the light that is used when reproducing the high density disk 29, that is diffracted by the hologram 131.

A focus signal (spot size detection method (SSD method)) and a tracking signal (push pull method) that are used when reproducing the high density disk 29 are obtained from the detection region 136. Furthermore, a signal for correcting offset caused by lens shift of the tracking signal is obtained from the detection region 137. Furthermore, the detection regions 136 and 137 also receive light that is used when reproducing the DVD disk 10 that has been diffracted by the hologram 132. A focus signal (spot size detection method (SSD method)) and a tracking signal (push pull method) that are used when reproducing the DVD disk 10 also are obtained from the detection regions 136 and 137.

Figure 10B:
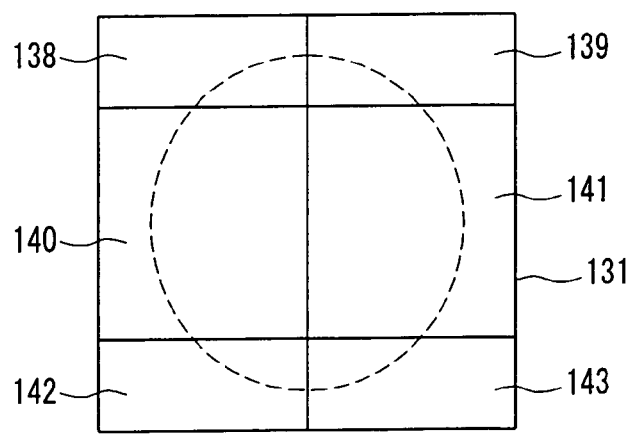
FIG. 10B is a front view of a hologram used in the optical head of Embodiment 3.

FIG. 10B shows an overview of the hologram 131. The dotted line in FIG. 10B represents the shape of the light beam on the hologram 131. The hologram 131 is divided into six regions 138-143. The light of the regions 140 and 141 is diffracted to the detection region 136. Although not illustrated, the interior of the regions 140 and 141 further is divided into regions for forward focal point use and regions for rear focal point use. The light of the regions 138, 139, 142 and 143 are diffracted to the detection region 137. The regions 138, 139, 142 and 143 have substantially no push pull signal component but include a large change component due to lens shift. Thus, a signal for correcting offset due to lens shift of the tracking signal can be obtained from the signal obtained from the detection region 137. The hologram 132 is not illustrated, however as a front view, it is divided in substantially the same way as the hologram 131. However, since the diffracting wavelength is different, there is a difference in the grating interval of the pattern, for example.

In the present embodiment, it is possible to optimize individually the pattern of the holograms to the high density disk and the DVD disk because individual independent holograms are used for the different wavelengths. Thus, even if optical disks that have different formats include dual-layer disks, then it is possible to record and reproduce information reliably.

Furthermore, even in the present embodiment, since it is possible to utilize a focusing method in which the effect on focusing when transversing the tracks is small, such as the SSD method, it is also possible to record and reproduce information reliably even in cases when the groove pitch is larger than the spot on the disk, such as with DVD-RAM.

It is also possible to share the detection regions, and thus it is possible to reduce the area of the photodetector, and at the same time to decrease the number of amps and the number of pins of the elements. Thus, it is possible to reduce the cost of optical head devices and optical disk apparatuses by using the optical head according to the present invention.

Embodiment 4

In Embodiment 4, an example is described in which a detection region that receives the light that is used for the focus signal is usually within range of the scattered light. The optical configuration is substantially the same as that in FIG. 9, however a photodetector 160 shown in FIG. 11A is used as a substitute for the photodetector 133, and holograms 161 and 162 shown in FIG 11B are substitutes for the holograms 131 and 132.

Figure 11A:
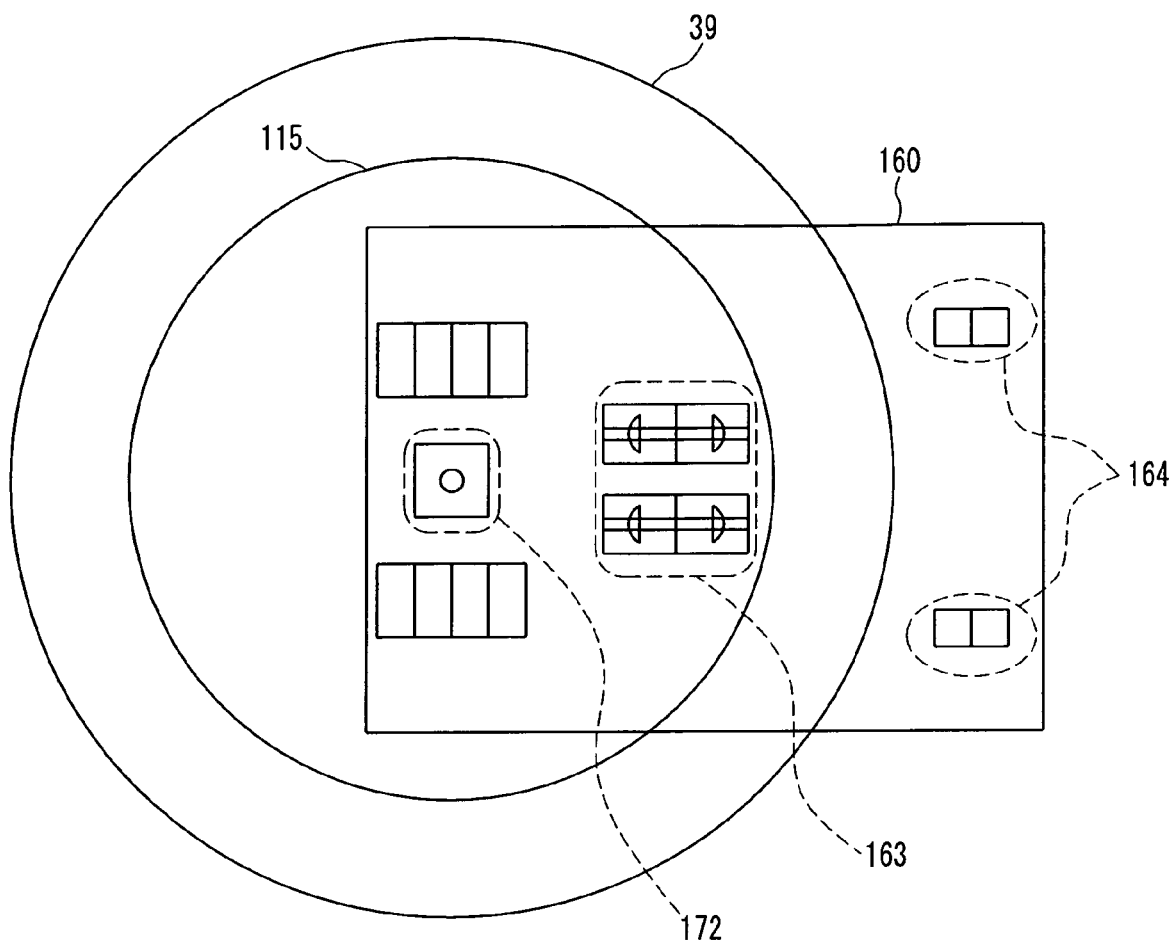
FIG. 11A is a front view of a photodetector used in an optical head of Embodiment 4.

FIG. 11A shows a front view of the photodetector 160. Detection regions 163 and 164 receive that light, of the light that is used when reproducing the high density disk 29, that is diffracted by the hologram 161. The detection region 163 is arranged on an inside region such that it does not straddle across an outside region and the inside region defined by the standard minimum range 115 of the other layer scattered light of the high density disk 29. The detection region 164 is arranged on an outside region such that it does not straddle across the outside region and an inside region defined by the standard maximum range 39 of the other layer scattered light of the DVD disk 10.

The detection regions 163 and 164 also receive that light, of the light that is used when reproducing the DVD disk 10, that is diffracted by the hologram 162. Four signals used for creating the RF signal, which is the signal for reproducing the information, and the tracking signal according to the phase differential method are obtained from a detection region 172. A focus signal (spot size detection method (SSD method)) and a tracking signal (push pull method) that are used when reproducing the high density disk 29 are obtained from the detection region 163. A signal for correcting offset due to lens shift of the tracking signal is obtained from the detection region 164. Furthermore, a focus signal (SSD method) and a tracking signal (push pull method) that are used when reproducing the DVD disk 10 also are obtained from the detection regions 163 and 164.

Figure 11B:
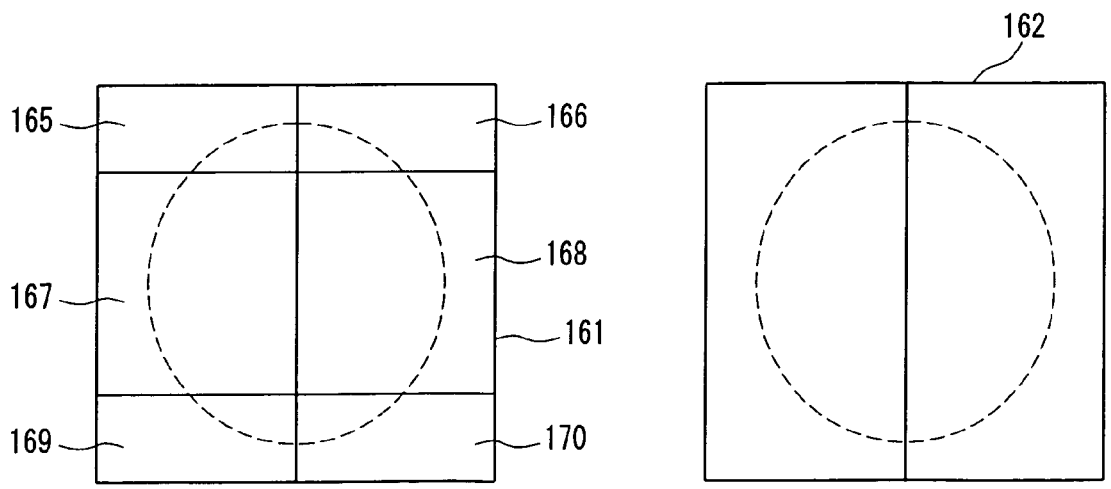
FIG. 11B is a front view of a hologram used in the optical head of Embodiment 4.

FIG. 11B shows an overview of the holograms 161 and 162. The dotted line in FIG. 11B represents the shape of the light beam on the holograms 161 and 162. The hologram 161 is divided into six regions 165-170. The light of the regions 167 and 168 is diffracted to the detection region 163 (during reproduction of high density disks). Although not illustrated, the interior of the regions 167 and 168 is divided further into regions for forward focal point use and regions for rear focal point use.

The lights of the regions 165, 166, 169 and 170 are diffracted to the detection region 164 (during reproduction of high density disks). The regions 165, 166, 169 and 170 have substantially no push pull signal component but include a large change component due to lens shift. Thus, a signal for correcting offset due to lens shift of the tracking signal can be obtained from the signal obtained from the detection region 164.

The hologram 162 shows an example of divisions that conform to standard push pull. The wavelength of light that is diffracted by the hologram 162 differs to that of the hologram 161, and thus, for example, the grating interval of the pattern of the holograms differs.

With the present invention, the photodetection regions for obtaining the signal for focusing are both within the other layer scattered light of dual-layer disks, both when reproducing high density disks and when reproducing DVD disks. Thus, offset due to scattered light exists when reproducing either of the disks, however even if there is a change between the interlayer thickness of the dual-layer disks, the change in offset is small. That is to say, the offset when reproducing both disks is about the same, and provided that the amount of the effect caused by the other layer scattered light is calculated in advance and removed, then even when optical disks of different formats include dual-layer disks, it is possible to reliably record and reproduce information.

Furthermore, even in the present embodiment, since it is possible to utilize a focusing method in which the effect on focusing when transversing the tracks is small, such as the SSD method, it is also possible to record and reproduce information reliably even in cases when the groove pitch is larger than the spot on the disk, such as with DVD-RAM.

In the present embodiment, the pattern of the holograms can be optimized individually to the high density disk and the DVD disk because individual, independent holograms are used for light of different wavelengths. Thus, even if optical disks having different formats include dual-layer disks, recording and reproduction of information can be performed reliably.

Moreover, because the detection regions can be shared, it is possible to reduce the area of the photodetection regions, and at the same time, reduce the number of amps and the number of pin elements. Thus, by using the optical head according to the present embodiment, it is possible to reduce the cost of the optical head device and the optical disk apparatus.

It should be noted that in Embodiments 2 and 4, examples were described in which the detection regions of both the high density disk and the DVD disk are inside the minimum range of the scattered light, however a configuration in which all the detection regions are within the minimum range of the scattered light is also possible.

Embodiment 5

Figure 12:
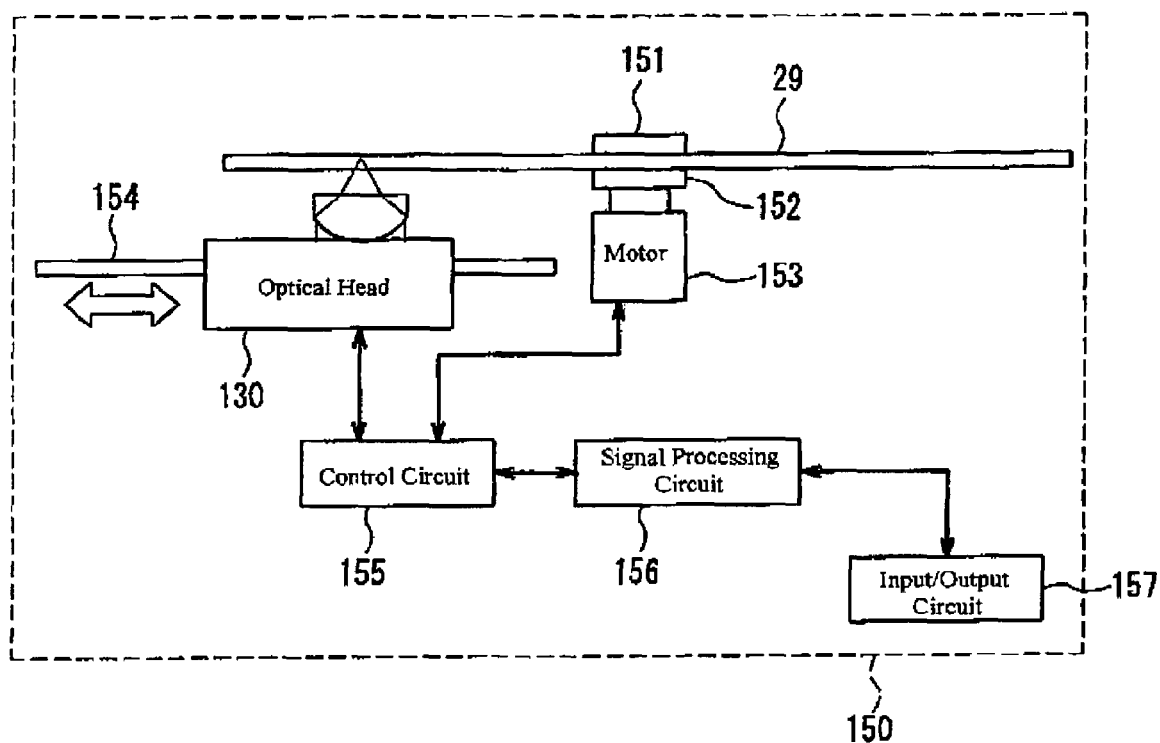
FIG. 12 is a structural diagram of an optical disk apparatus of Embodiment 5.

FIG. 12 shows an overall structural view of an optical disk apparatus (optical disk drive) 150 according to an embodiment of the present invention. The optical disk apparatus 150, which is an optical disk apparatus, is provided with an optical head 130. The optical disk apparatus 150 may be dedicated only to reproducing disks, or may be capable of both recording and reproduction.

The optical head 130 may be any one of the above-noted Embodiments 1 to 4. The optical disk 29 is fixably clamped by a clamper 151 and a turntable 152, and rotates by a motor (rotating system) 153. The optical head 130 rides on a traverse (moving system) 154, and an irradiated point of light is set so as to be movable from an inner periphery to an outer periphery of the optical disk 29.

A control circuit 155 performs focus control, tracking control, traverse control and rotation control of the motor, for example, based on the signal received from the optical head 130. Furthermore, a signal processing circuit 156 reproduces information from the reproduction signal, outputs it to an input/output circuit 157, and transfers the signal that was received from the input/output signal 157 to the optical head 130 via the control circuit 155.

Embodiment 6

Figure 13:
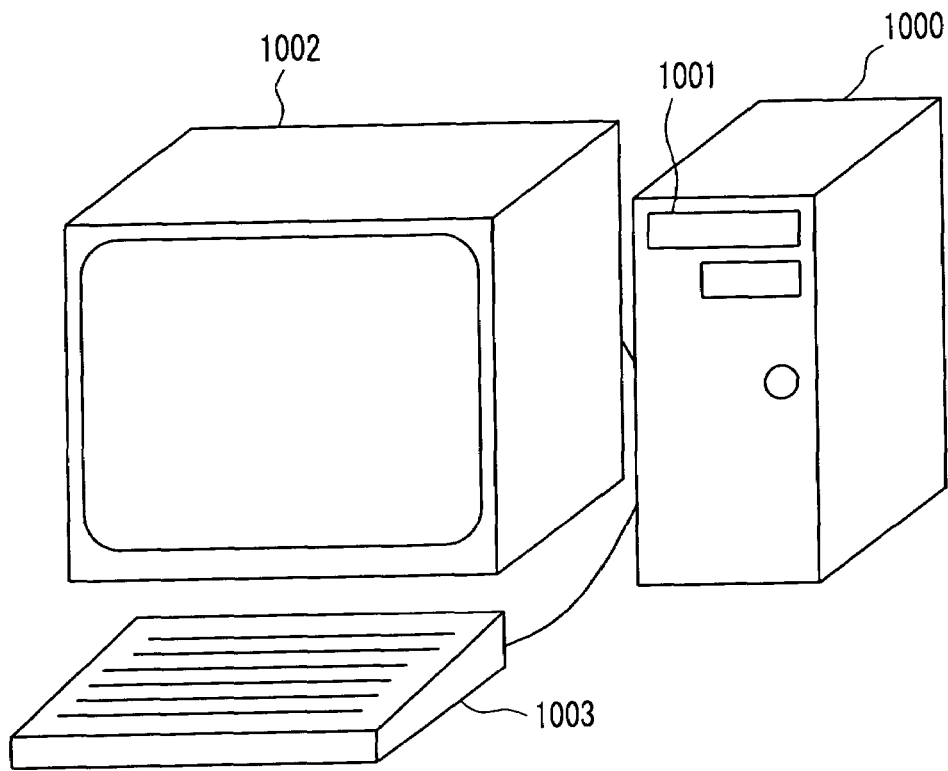
FIG. 13 is an external view of a computer in which the optical disk apparatus of the present invention is used.

FIG. 13 shows a perspective view of a computer according to an embodiment of the present invention. The computer in the diagram is provided with an optical disk according to Embodiment 5. In FIG. 13, a computer (personal computer) 1000 includes an optical disk apparatus 1001, a keyboard 1003 for inputting information, and a monitor 1002 for displaying information.

The computer according to the present embodiment is provided with an optical disk apparatus according to Embodiment 5 as an external memory apparatus, and thus it is possible reliably to record and reproduce information onto optical disks of different varieties, and may be used in a wide range of applications.

The optical disk apparatus may be used for backing up a hard disk in the computer by making use of its large storage capacity. Furthermore, by making use of the low cost and portability of the media (optical disk), and its interchangeability, in which its information can be read out on another optical disk drive, programs or data can be exchanged with other people, or can be carried for personal use. Furthermore, it can also handle reproduction and recording of pre-existing media such as DVDs or CDs.

Embodiment 7

Figure 14:
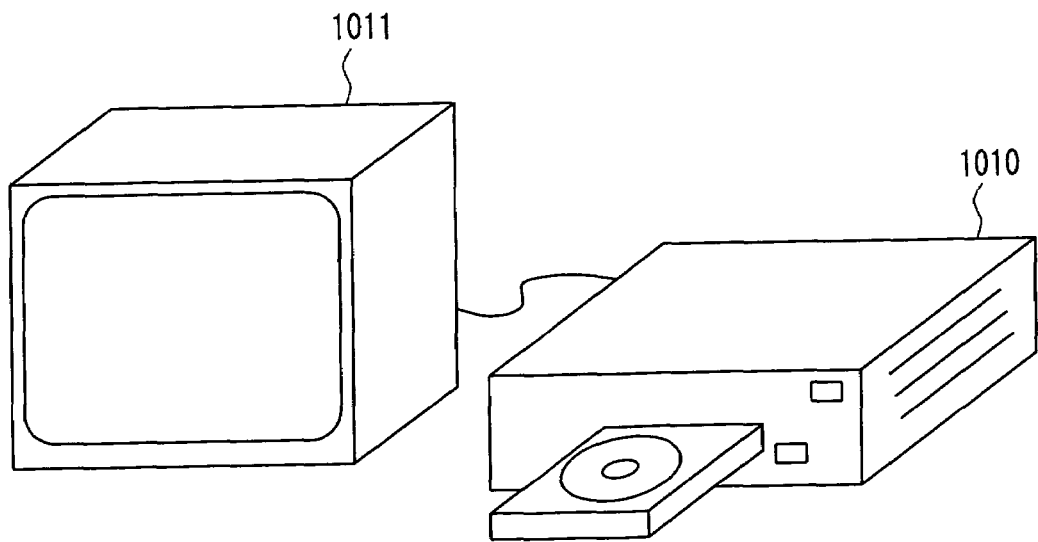
FIG. 14 is an external view of an optical disk recorder in which the optical disk apparatus of the present invention is used.

FIG. 14 shows a perspective view of an optical disk recorder (image recording apparatus) according to an embodiment of the present invention. The optical disk recorder shown in this diagram is provided with an optical disk apparatus according to Embodiment 5. In FIG. 14, an optical disk recorder 1010 has an optical disk apparatus according to Embodiment 5 and is used, connected to a monitor 1011 for displaying recorded images.

The optical disk recorder according to the present embodiment is provided with an optical disk apparatus according to Embodiment 5, and thus reliably can record and reproduce images on optical disks of different varieties, and may be used in a wide range of applications. The optical disk recorder can record images onto media (optical disks), and these may be reproduced at a time of ones choice.

There is no necessity to rewind the optical disk like a tape after recording and after reproduction, and chase replay, in which the start of a program can be reproduced while recording that program, and simultaneous recording / replaying, in which a pre-recorded program is reproduced while recording another program, are possible.

Moreover, by making use of the low cost and portability of the media (optical disk), and its interchangeability, in which its information can be read out on another optical disk drive, programs or data can be exchanged with other people, or can be carried for personal use. Furthermore, it can also handle reproduction and recording of pre-existing media such as DVDs or CDs.

It should be noted that the description here is of an optical disk recorder provided with only an optical disk drive, however an internal hard disk can also be provided, as can a video tape that has a recording and reproduction function. In this manner, temporary saving or backup of images is facilitated.

Embodiment 8

Figure 15:
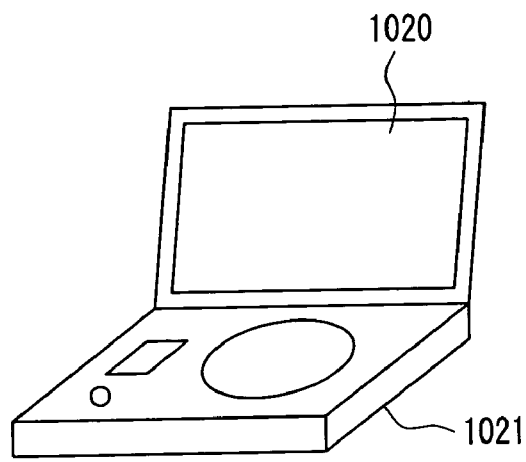
FIG. 15 is an external view of an optical disk player in which the optical disk apparatus of the present invention is used.

FIG. 15 shows a perspective view of the optical disk player according to an embodiment of the present invention. The optical disk player is provided with an optical disk apparatus according to Embodiment 5.

In FIG. 15, an optical disk player 1021 is provided with a liquid crystal monitor 1020, and includes the optical disk apparatus according to Embodiment 5. Images that are recorded on optical disks can be displayed on the liquid crystal monitor 1020.

The optical disk player according to the present invention is provided with the optical disk apparatus according to the above-noted Embodiment 5, and thus reliably can reproduce optical disks of different varieties, and can be used in a wide range of applications.

Furthermore, the optical disk player can reproduce images, which are recorded onto media, when desired. There is no necessity to rewind the optical disk like a tape after reproduction, and images can be accessed and reproduced at a desired location. Furthermore, it can also handle pre-existing media such as DVDs or CDs.

Embodiment 9

Figure 16:
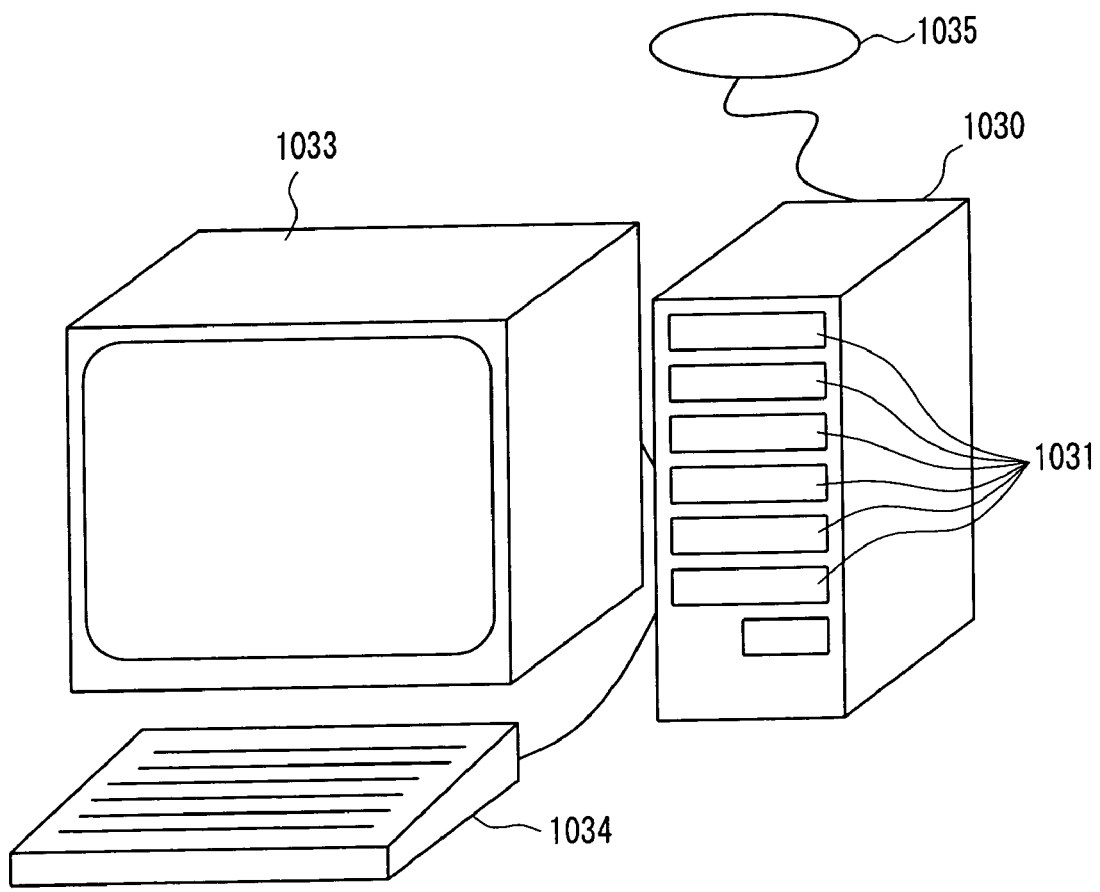
FIG. 16 is an external view of a server in which the optical disk apparatus of the present invention is used.

FIG. 16 shows a perspective view of a server according to an embodiment of the present invention. The server shown in this diagram is provided with an optical disk apparatus according to Embodiment 5. In FIG. 16, a server 1030 includes an optical disk apparatus 1031 according to Embodiment 5, a monitor 1033 for displaying information and a keyboard 1034 for inputting information. The server is connected to a network 1035.

The server according to the present embodiment is provided with the optical disk apparatus according to Embodiment 5 as an external memory apparatus, and thus it reliably can record and reproduce information from disks of different varieties, and can be used in a wide variety of applications.

Making use of the large capacity of optical disks, information (such as images, speech, moving images, HTML text and text documents) that is recorded on the optical disk is transmitted in response to a demand from the network 1035. Furthermore, information that is sent from the network is recorded in the requested position. Furthermore, since it is also possible to reproduce information that is recorded on pre-existing media, such as CDs and DVDs, it is also possible to transmit that information.

Embodiment 10

Figure 17:
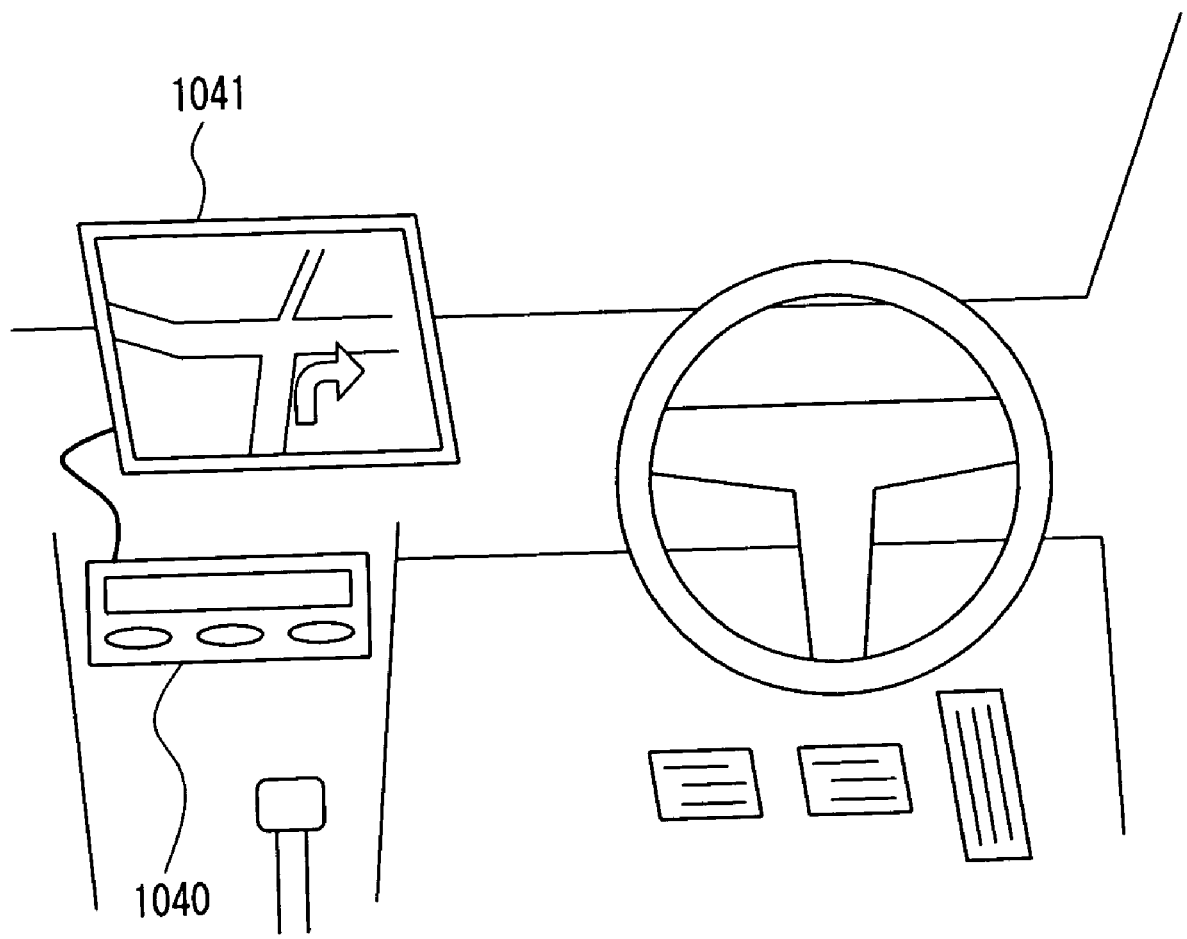
FIG. 17 is an external view of a car navigation system in which the optical disk apparatus of the present invention is used.
Figure 18A:
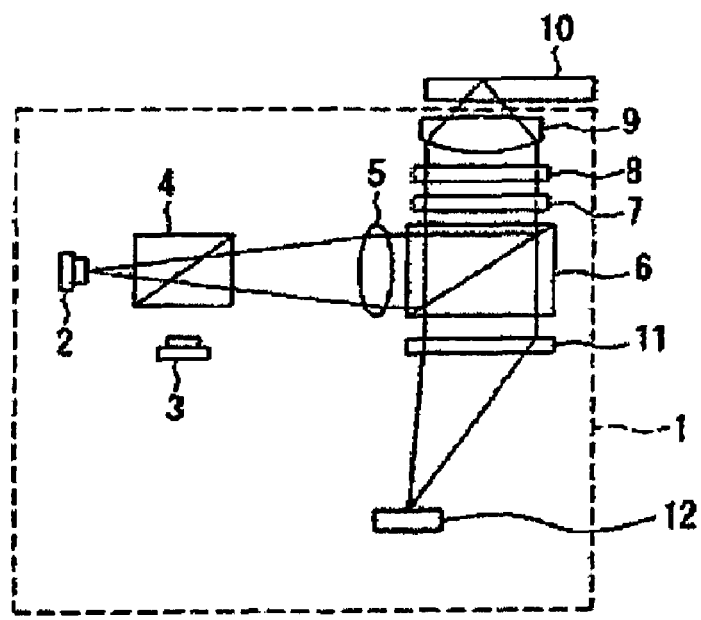
FIG. 18A is a diagram for explaining how to record and reproduce DVD disks with a conventional optical head.
Figure 18B:
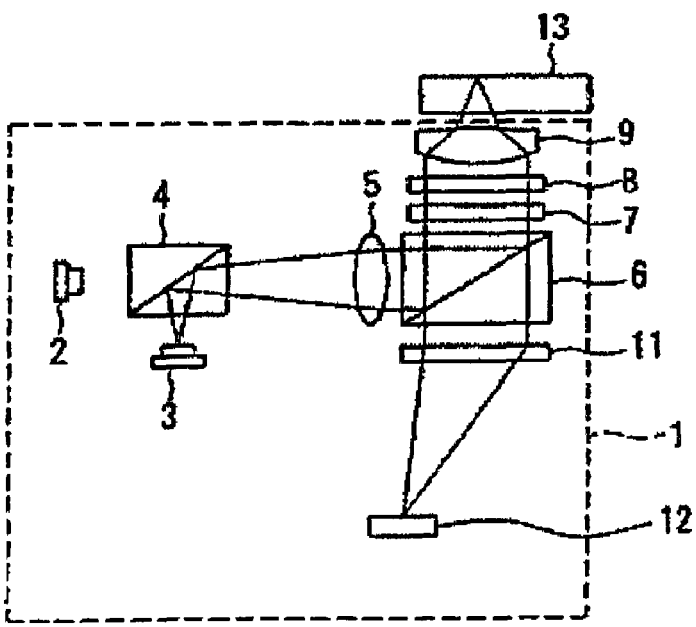
FIG. 18B is a diagram for explaining one example of how to record and reproduce CD disks with a conventional optical head.
Figure 19A:
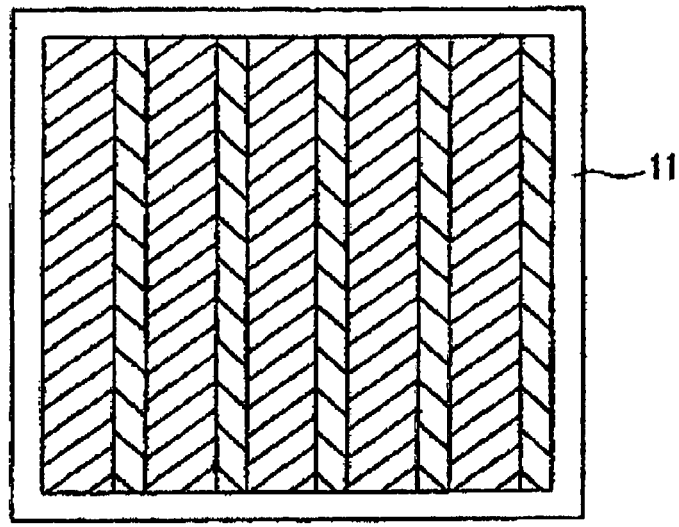
FIG. 19A is a front view of one example of a hologram that is used in a conventional optical head.
Figure 19B:
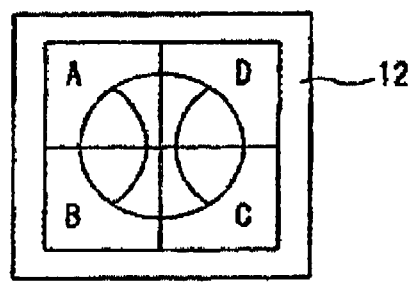
FIG. 19B is a front view of one example of a photodetector that is used in a conventional optical head.

FIG. 17 shows a perspective view of a car navigation system according to an embodiment of the present invention. The server shown in this diagram includes an optical disk apparatus according to Embodiment 5. In FIG. 17, a car navigation system 1040 includes the optical disk apparatus according to Embodiment 5, and is used, connected to a liquid crystal monitor 1041 for displaying topographical and destination information.

The car navigation system according to the present embodiment is provided with the optical disk system according to Embodiment 5, and thus images reliably can be recorded and reproduced from different types of optical disks, and it can be used over a wide range of applications. The car navigation system 1040 calculates its present position based on information from map information recorded on a medium (optical disk), a geo-positioning system (GPS) or a gyroscope, a speedometer and an odometer, and displays that position on the liquid crystal monitor. Furthermore, if the destination is input, the system calculates the optimum route to the destination based on the map information and the road information, and displays this on the liquid crystal monitor.

By using a large capacity optical disk to record the map information, it is possible to provide detailed road information covering a wide area on a single disk. Furthermore, information about restaurants, convenience stores and petrol stations that are in the vicinity of the roads can also be simultaneously provided, contained on the optical disk.

Moreover, with the passage of time, road information becomes old and inaccurate, however since optical disks are interchangeable, and the media is cheap, the latest information can be obtained by substitution with a disk containing the newest road information. Furthermore, since the car navigation system can handle the recording and reproduction of pre-existing media such as DVDs and CDs, it is possible to watch movies or listen to music inside the vehicle.

INDUSTRIAL APPLICABILITY

With the present invention as noted above, even if optical disks of different formats include dual-layer disks, the effect of scattered light can be suppressed to a small amount, information can be recorded and reproduced reliably, and thus the present invention is useful, for example, in optical disk apparatus, optical disk recorders, optical disk players, server and car navigation systems.

The invention claimed is:

1. An optical head comprising:

a first light source that emits light of a first wavelength for at least either one of recording and reproducing information of a first information recording medium;

a second light source that emits light of a second wavelength for at least either one of recording and reproducing information of a second information recording medium;

an optical element for diffracting light of the first and the second wavelength; and a photodetector that is provided with a detection region for detecting light that is reflected by the first information recording medium or the second information recording medium, and that passes through the optical element;

wherein the first information recording medium and the second information recording medium are multi-layer disks having at least two recording layers;

wherein the detection region includes a first diffracted light detection region for detecting one of first and higher order diffracted light of the first wavelength that is diffracted by the optical element, and a second diffracted light detection region for detecting one of first and higher order diffracted light of the second wavelength that is diffracted by the optical element;

wherein the first diffracted light detection region is arranged such that it does not overlap an outline of a spot on the photodetector of zero order light coming from the first information recording medium that comes from a recording layer that differs from the recording layer that is to be recorded or reproduced;

wherein the second diffracted light detection region is arranged such that it does not overlap an outline of a spot on the photodetector of zero order light coming from the second information recording medium that comes from a recording layer that differs from the recording layer that is to be recorded or reproduced;

wherein the spot on the photodetector changes from a minimum range to a maximum range;

wherein each of the first diffracted light detection region and the second diffracted light detection region includes a plurality of diffracted light detection regions;

wherein both of all the first diffracted light detection regions and all the second diffracted light detection regions are arranged inside the smaller range of a first minimum range, which is the minimum range of the spot on the photodetector of zero order light coming from the first information recording medium that comes from a recording layer that differs from the recording layer that is to be recorded or reproduced, and a second minimum range, which is the minimum range of the spot on the photodetector of zero order light coming from the second information recording medium that comes from a recording layer that differs from the recording layer that is to be recorded or reproduced.

2. An optical disk apparatus comprising:

an optical head according to claim 1, and a rotating system and a movement system for moving the first and die second information recording medium relative to the optical head.

* * * * *

UNITED STATES PATENT AND TRADEMARK OFFICE
CERTIFICATE OF CORRECTION

PATENT NO. : 7,518,976 B2 Page 1 of 1
APPLICATION NO. : 10/543537
DATED : April 14, 2009
INVENTOR(S) : Sano et al.

It is certified that error appears in the above-identified patent and that said Letters Patent is hereby corrected as shown below:

Column 22, line 28 (claim 2): "die second information recording medium" should read --the second information recording medium--.

Signed and Sealed this

Twenty-ninth Day of September, 2009

David J. Kappos
*Director of the United States Patent and Trademark Office*